Feb. 28, 1956　　　J. M. FLUKE　　　2,736,555
BOWLING PIN HANDLING AND CHANGING MACHINE
Filed Aug. 18, 1947　　　10 Sheets-Sheet 1

INVENTOR
JOHN. M. FLUKE.
BY
ATTORNEY

Feb. 28, 1956  J. M. FLUKE  2,736,555
BOWLING PIN HANDLING AND CHANGING MACHINE
Filed Aug. 18, 1947  10 Sheets-Sheet 3

INVENTOR
JOHN M. FLUKE.
BY
ATTORNEY

Feb. 28, 1956 J. M. FLUKE 2,736,555
BOWLING PIN HANDLING AND CHANGING MACHINE
Filed Aug. 18, 1947 10 Sheets-Sheet 4

INVENTOR
JOHN. M. FLUKE.
BY *Wentworth B. Clapham*
ATTORNEY

Feb. 28, 1956  J. M. FLUKE  2,736,555
BOWLING PIN HANDLING AND CHANGING MACHINE
Filed Aug. 18, 1947  10 Sheets-Sheet 5

FIG. 7

INVENTOR
JOHN. M. FLUKE.
BY *Wentworth B. Clapham*
ATTORNEY

Feb. 28, 1956    J. M. FLUKE    2,736,555
BOWLING PIN HANDLING AND CHANGING MACHINE
Filed Aug. 18, 1947    10 Sheets-Sheet 7

INVENTOR
JOHN M. FLUKE.
BY Wentworth B. Clapham
ATTORNEY

Feb. 28, 1956 J. M. FLUKE 2,736,555
BOWLING PIN HANDLING AND CHANGING MACHINE
Filed Aug. 18, 1947 10 Sheets-Sheet 8

INVENTOR
JOHN M. FLUKE.
BY
Wentworth B. Clapham
ATTORNEY

Feb. 28, 1956          J. M. FLUKE          2,736,555
BOWLING PIN HANDLING AND CHANGING MACHINE
Filed Aug. 18, 1947          10 Sheets-Sheet 9
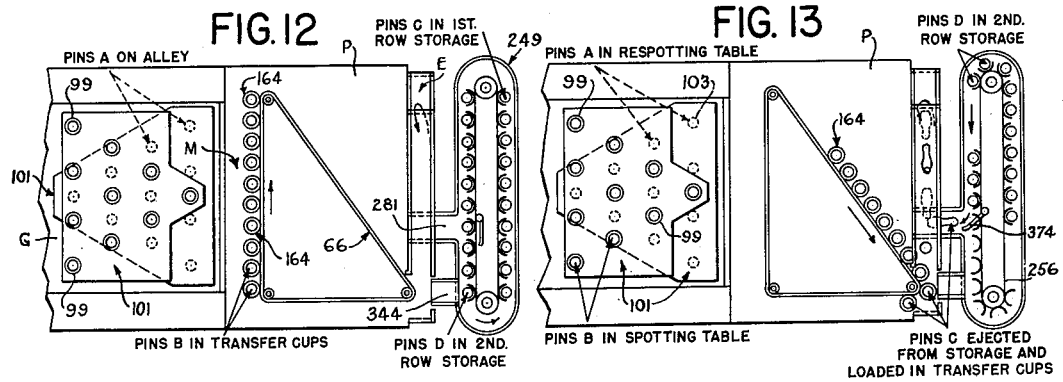
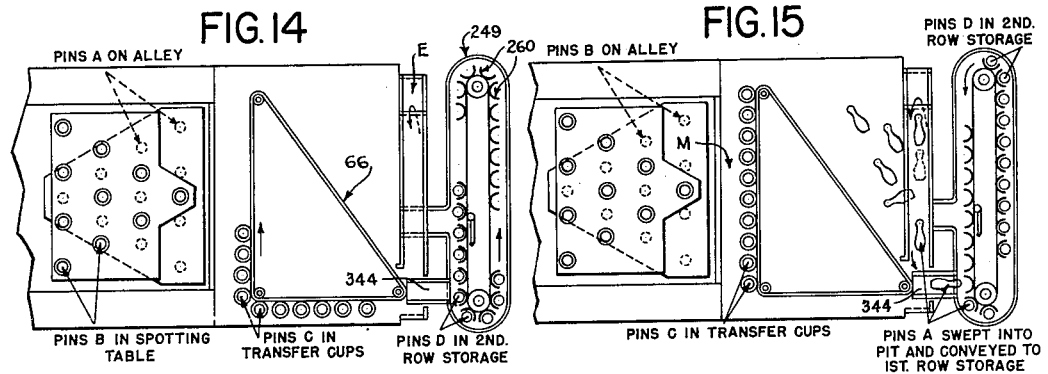
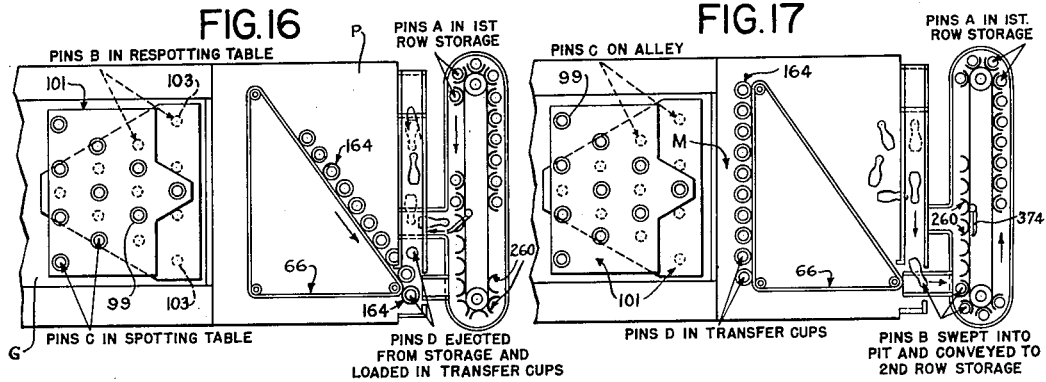
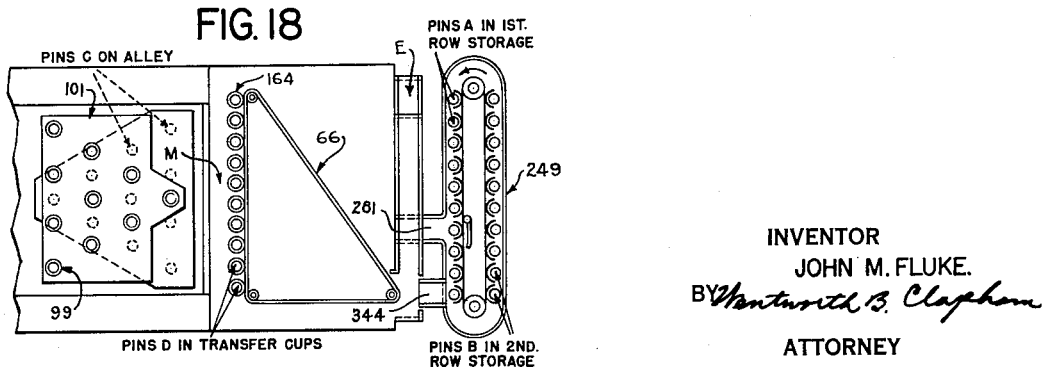
INVENTOR
JOHN M. FLUKE.
BY
ATTORNEY

INVENTOR
JOHN M. FLUKE
BY
ATTORNEY

United States Patent Office 2,736,555
Patented Feb. 28, 1956

2,736,555

BOWLING PIN HANDLING AND CHANGING MACHINE

John M. Fluke, Fairfield, Conn., assignor to American Machine and Foundry Company, a corporation of New Jersey Application August 18, 1947, Serial No. 769,214

26 Claims. (Cl. 273—43)

This invention relates to bowling pin setting machines and more particularly to improvements in automatic bowling pin spotting machines having mechanism for spotting and respotting pins, and for effecting changes in sets of pins whenever it is desired to change from one set of pins to another, as, for example, if it is desired to change from league game pins to "open-play" pins, or vice versa, or to change pins, preferably in sets in order to equalize wear and tear on several sets of pins, which may be all league pins or open play pins.

In bowling pin spotting machines heretofore known, it has been customary to employ two or more sets of pins in order that while one set of pins, usually ten, is in actual play, the other pins are distributed in various conveying parts of the machine and/or lying in the pit awaiting delivery to the spotter or a pin magazine ready for delivery to the spotter. In machines which require more than two sets of pins, and particularly those in which less than ten pins to a set are used, an unsatisfactory situation is present because of the necessity of breaking up sets of pins, a set of pins usually consisting of ten pin. This contributes to inefficiency in pin usage and also adds to the costs.

The present invention overcomes this difficulty and makes it possible to use no more than two full sets of pins. This is accomplished by providing a pin assembling conveyor provided with a number of pin supporting holders, usually ten, so constructed and arranged that pins are fed to a pin delivery station and delivered therefrom to a spotter.

Arranged in cooperative association with the pin handling mechanism, described directly above, is a pin storage device in which full sets of pins can be maintained in reserve for change or substitution for pins in play.

The invention takes into consideration the problem of automatically transferring one or more sets of pins from active play into storage and the replacement of such sets of pins with reserve sets for further play of the game.

For instance, it is well known that in "open play," bowling alley proprietors very often use worn pins or pins which have been dressed or redressed in order to make them suitable for further play of the game although such pins would not conform to American Bowling Congress requirements for league play. However, the casual bowler often does not mind the lack of uniformity in pins against which he is rolling. Different conditions obtain, however, in so-called league bowling where pins used must meet certain standards specified by the American Bowling Congress. In this case, and also when a bowler requests league play pins, it is necessary to remove the "open play" pins and replace them with league pins.

In automatic bowling pin spotting machines, it is highly desirable that sets of pins can be changed with a minimum of effort without interrupting the play of the game for an unduly long period of time, especially when sets of league play pins are to be substituted for open play pins, or vice versa.

According to my invention, and the machine illustrated, two sets of pins are normally in play. Two sets of reserve pins, which may be "open play," or league pins, are retained in storage for rapid change-over and substituted if and when it is desired to switch the sets of pins and send those in play to storage and substitute therefor pins which formerly were in storage. While reference is made to exchanging "open play" pins for league pins, and vice versa, it is obvious that the exchange of pins could be so arranged that open play or league pins in reserve could be exchanged for open play or league pins in play, respectively. For example, if there are two sets of league pins in reserve, and two sets of league pins in play, the reserve league pins can be exchanged for the league pins in play. The same condition holds for open play pins. This obivously minimizes wear and tear on pins and makes the useful cycle of each pin more uniform.

It is an object of my invention to provide novel bowling pin handling mechanism for a bowling pin spotting machine.

The invention also contemplates the use of coordinated and cooperating pin conveying, handling and manipulating mechanisms which deliver pins to a position for loading into a pin spotter and make possible the automatic and rapid change-over of one set of pins for another.

The invention also consists in the provision of automatically operated pin changing mechanism which functions to effect a substitution of one set of pins for another. For instance, if the game is played with a set of pins and it is desired to replace them with a reserve set, by means provided by this invention, the desired change can be made automatically in a minimum amount of time.

Although the machine described is designed primarily for effecting the exchange of two sets of pins, it may also be so operated as to effect the change of a single set of pins. In this manner single sets of pins can be exchanged and the wear and tear of pins can be so equalized that all pins in play, and in storage have a longer and more uniform life. This arrangement is especially desirable where four sets of league pins or four sets of open-play pins are being used in connection with a machine. It makes possible the progressive use of pins, preferably sets, so that from time to time at the will of the bowling alley proprietor a different set of pins can be made available for play.

It is a further object of my invention to provide a magazine capable of storing pins in reserve ready for substitution for other pins which may be in play at the time such reserve pins are held in storage.

The mechanism used for effecting the change-over when once set into operation, automatically functions to substitute a number of pins corresponding to the number of pins which were in play prior to the operation of the pin changing mechanism.

With these and other objects not specifically mentioned in view, the invention consists in certain combinations and constructions which will be hereinafter fully described, and then set forth in the claims hereunto appended.

In the accompanying drawings which illustrate a preferred embodiment of the invention and form a part of this specification, and in which like characters of reference indicate the same or like parts:

Figure 7 is a rear elevation with parts broken away of the pin storage device;

Figures 12–18 are schematic diagrams showing successive steps in effecting the exchange of two sets of pins in the storage for two sets of pins in the pin spotting machine.

This invention is particularly adaptable for use in a machine of the general type disclosed in Rundell Patent No. 2,388,707, issued November 13, 1945; Schmidt application, Serial No. 636,737, for Bowling Pin Setting Machine, filed December 22, 1945, now Patent 2,578,319, issued December 11, 1951; and Broekhuysen application, Serial No. 627,605, filed November 9, 1945, now Patent 2,559,274, granted July 3, 1951. Its use is not to be considered limited to such machines, however, since it may find ready application in other types of bowling pin spotting machines.

In the machines disclosed and described in the above referred to patents, bowling pins delivered into the pit of an alley are raised by conveying mechanism and are conveyed by mechanism forming a part of the general conveying system between a pair of spaced spiral members designed to arrange bowling pins entering therebetween into an aligned assembly awaiting delivery therefrom to a pin spotter by means of a pin transfer device.

As mentioned hereinabove, from time to time, it is necessary to dress and/or repair bowling pins in order to prolong their periods of use and maintain operating costs as low as possible. Where it is necessary to dress down or turn a pin so as to reduce its girth such that its maximum diameter is also reduced, it sometimes happens that when a plurality of bowling pins, usually ten or eleven, is fed between the two spaced pin supporting members awaiting delivery by the transfer device to the pin spotters, the longitudinal axes of the pins may be improperly positioned with respect to the grippers of the transfer device which engage the several pins in the aligned assembly, hold them firmly, and deliver them to the pin spotters.

The present machine constitutes a solution of this problem inasmuch as it makes possible the delivery of pins to a pin delivery station where each pin is substantially, accurately positioned for proper engagement and removal by the pin transfer grippers to the pin spotters.

Figure 1:
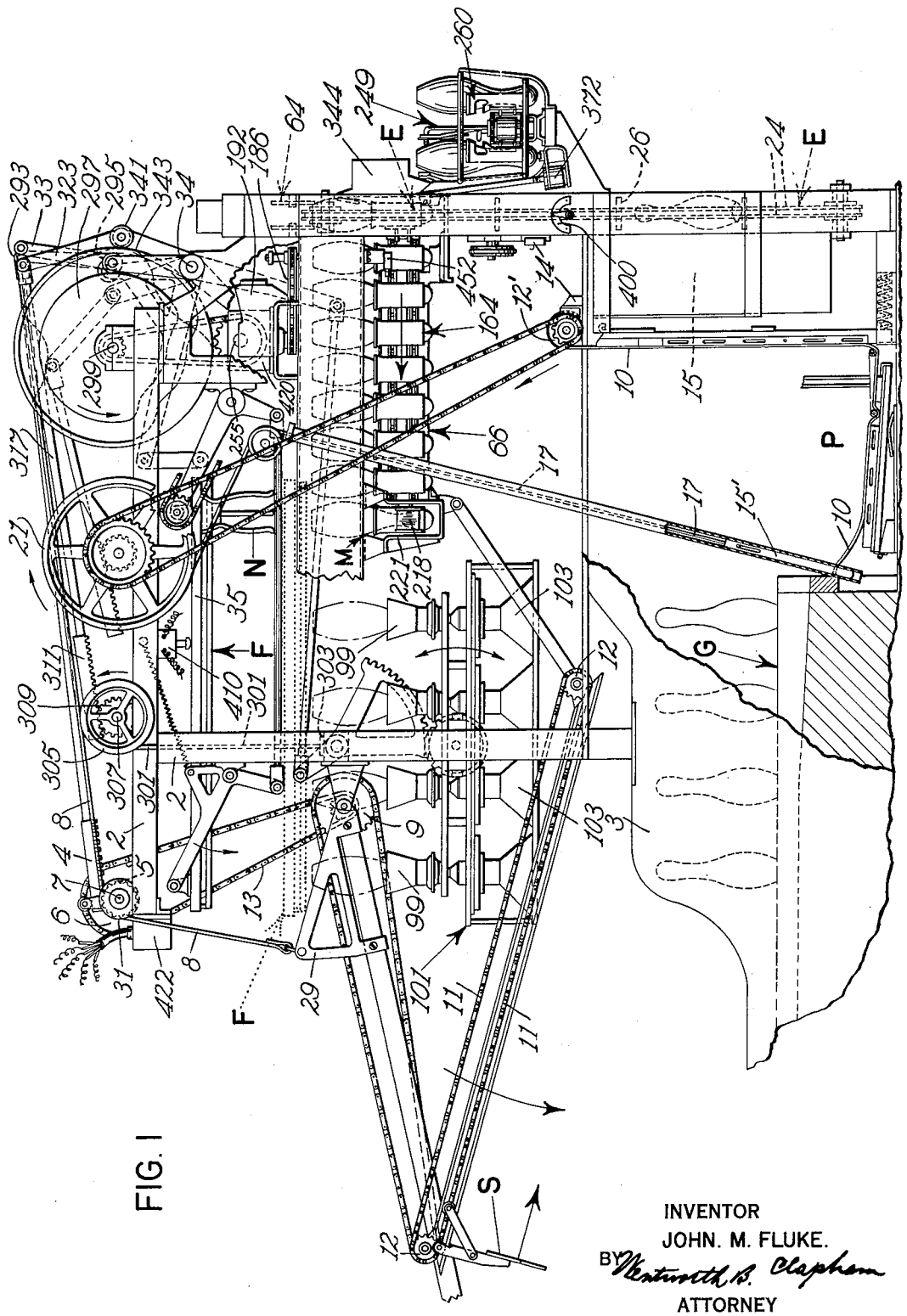
Figure 1 is a partial side elevation of a bowling pin spotting machine embodying the invention.
Figure 2:
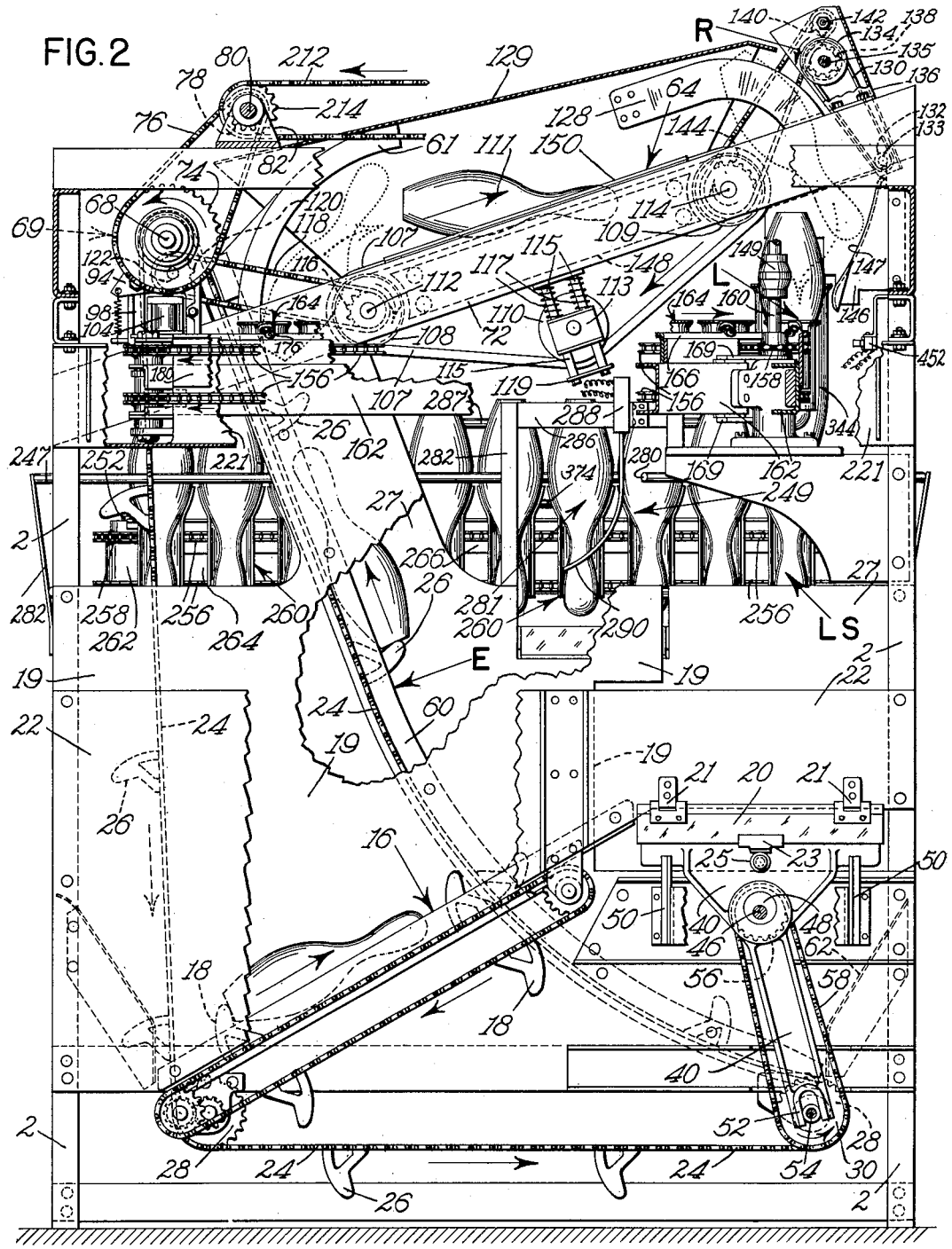
Figure 2 is a front elevation taken on line 2—2 of Figure 3, with parts broken away, illustrating the mechanism employed for elevating pins for selective delivery to the pin distributing device and the storage device.
Figure 3:
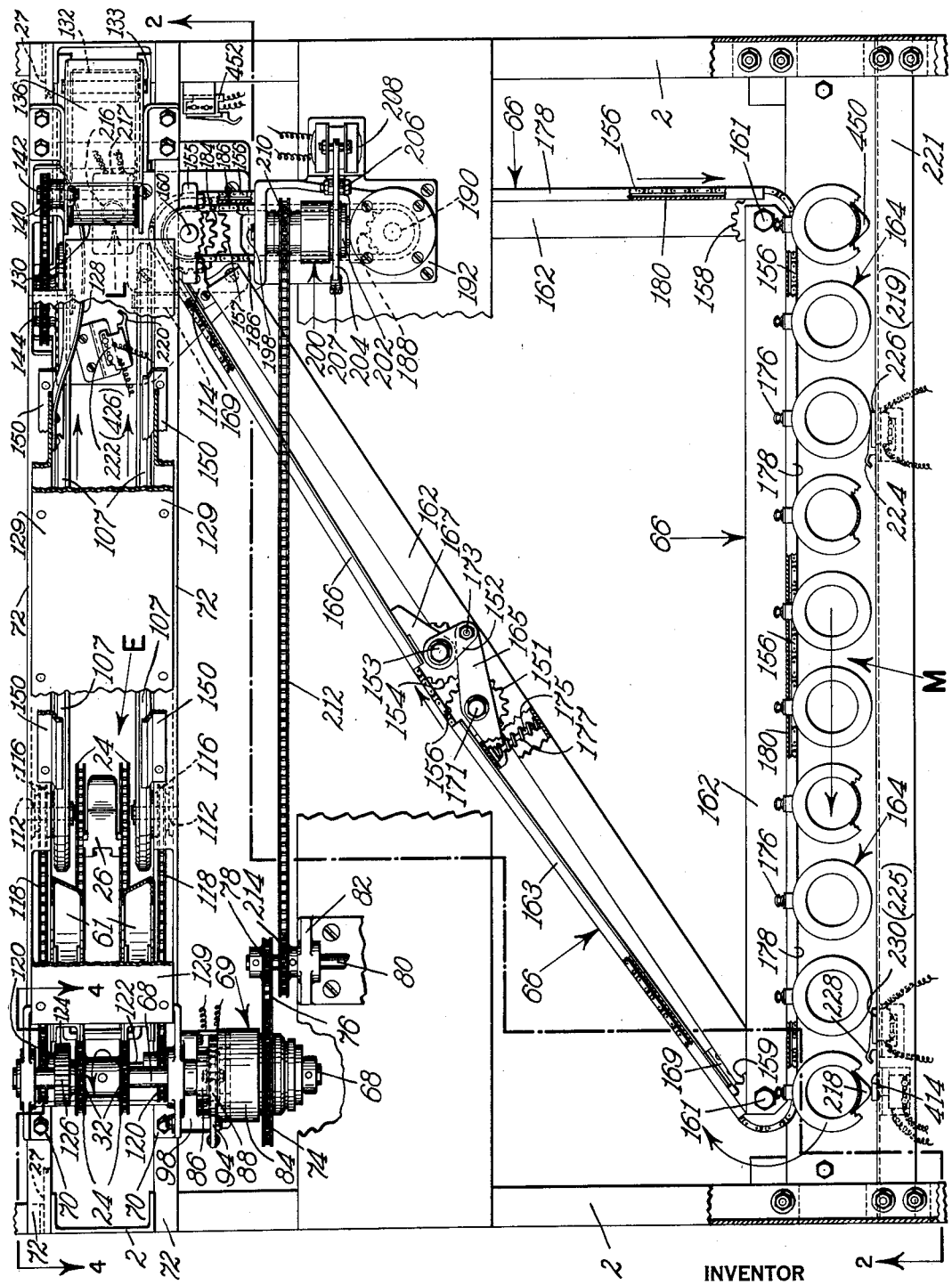
Figure 3 is a plan view of the rear portion of the pin spotting machine, showing the relative position of the pin distributing device with respect to the pin elevating conveyor.

Referring to the drawings in Figures 1, 2 and 3, there is shown a bowling pin spotting machine of the general type referred to consisting of side frames 2 between which are supported the several operating parts of the machine. Side frames 2 are adapted to be supported on the kick backs 3 of a bowling alley.

A sweep S (as shown in Figure 1) is constructed and operated in a manner similar to that shown and described in Schmidt Patent 2,578,319 by means of rack 4 and pinion 5. Sweep S is lowered into operative position relative to an alley G for sweeping deadwood and unwanted standing pins into the pit P onto apron 10 which at the proper time is raised to deliver pins rearwardly between the transverse ball guides 14 into chamber 15 from whence the pins are conveyed by mechanism described more in detail hereinafter.

Sweep S is attached to chains 11 running on sprockets 12 driven by a suitable chain running on a lower sprocket (not shown), and a sprocket 9 which in turn is driven by chain 13 running on sprocket 6 attached to shaft 7 which is rotated by rack 4, and pinion 5, as described. At the proper time during the operation of the machine, in a manner similar to that described in said Schmidt Patent 2,578,319, the rotation of a suitable cam (not shown) on shaft 299, which is tracked by cam follower 295 on lever 293 causes the movement of rack 4 and hence the desired rotation of pinion 5 to effect the operation of moving the sweep S back and forth along the pin supporting portion of the alley. Sweep S is raised and lowered at the proper time during the operation of the machine by means of cable 8, secured to sweep bracket 29, which runs on pulley 31 loose on shaft 7. One end of cable 8 is secured to lever 33 loosely mounted on shaft 34 having a follower (not shown) engaging a suitable cam (not shown) on shaft 299. A suitable guard (not shown) is employed to prevent a player from rolling a ball down the alley when pins are being spotted and respotted. After the pins and a ball have been swept into the pit they are received upon a flexible apron 10 which may be similar in construction and operation to that described in Schmidt Patent 2,578,319. One end of the apron is attached to slide blocks 15' adapted to be moved by cables 17 upwardly to a discharge position; the other end is attached to a roller 12'. When the apron is wound up, pins and balls carried thereby are ejected by the apron rearwardly therefrom.

The ball comes to rest and rolls along transverse guideways 14 which deliver it onto a ball return runway of conventional design extending along the alley. Pins drop downwardly between rails 14 into pin receiving chamber 15. Some of the pins are received directly upon the upper run of an inclined transverse conveyor 16 (Figure 2) having flights 18 which carry the pins upwardly towards the center of the machine. Pins at the other side of the center of the machine pass downwardly upon a horizontal and rearwardly inclined oscillated plate 20 pivoted at 21 at its upper edge on the transverse wall or panel 22.

Plate 20 directs any pins falling onto it rearwardly into engagement with the lower, upwardly moving end of the main elevating conveyor E (Figure 2). Elevator E comprises a pair of spaced chains 24 mounting spaced pin carrying fingers 26. The construction and operation of elevator E is similar to that disclosed in Rundell Patent No. 2,388,707, except that the pin elevating flight portion is more inclined and the conveyor has a somewhat triangular formation. Chains 24 run on guide sprockets 28, and driving sprockets 32, the latter being located adjacent the top portion of the conveyor E. The drive for sprockets 32 is described more in detail hereinafter.

The provision of conveyor 16 in chamber 15 at one side of the machine and deflector plate 20 at the other side thereof enables pins received in chamber 15 to be spread out for elevating and delivery, since pins delivered to plate 20 are received directly upon and carried upwardly by elevator E while pins on conveyor 16 are directed subsequently by that conveyor to the lower portion of elevator E after other pins have moved out of the way.

The oscillating movement of plate 20 is effective in preventing jams of pins. Plate 20 is provided adjacent its lower edge with a projection 23 resting on a roller 25 mounted on the upper end of an oscillator 40 which is given a short up and down vibratory motion to cause plate 20 to oscillate about its pivots 21. Oscillator 40 (as shown in Figure 2) is provided with an eccentric portion 48 on shaft 46 rotatably mounted in oscillator 40 whereby the latter is moved up and down as shaft 46 rotates.

In order to control the movement of oscillator 40, which is confined by the projections 50 secured to a transverse channel attached to the rear of the machine, at the lower end oscillator 40 is provided with a yoke 52 straddling the projecting end of shaft 54 to which is fixed sprocket 28 engaging with and driven by chain 24. To drive shaft 46 and eccentric 48, shaft 46 has mounted thereon, a sprocket 56 about which runs a chain 58 receiving movement from the sprocket 30 also secured to shaft 54 mentioned hereinabove. A laterally inclined plate 62 (Figure 2) mounted between the two spaced transverse panels 19, 27 assists in directing pins downwardly from plate 20 towards the active pin elevating portion of conveyor E which is confined between panels 19 and 27.

Bowling pins delivered from the pit of the alley onto conveyor E are moved by flights 26 upwardly one by one (as shown in Figures 1 and 2) between guides 60 suitably supported between spaced transverse panels 19, 27 at the rear of the machine. The upper end portions 61 of guides 60 are curved and preferably overhang conveyor 64 in order to assist in the proper delivery and disposition of pins one by one into conveyor 64. Since the general construction and operation of conveyor E is substantially the same as that shown in the above referred to Rundell patent, a detailed description thereof is deemed unnecessary.

Figure 4:
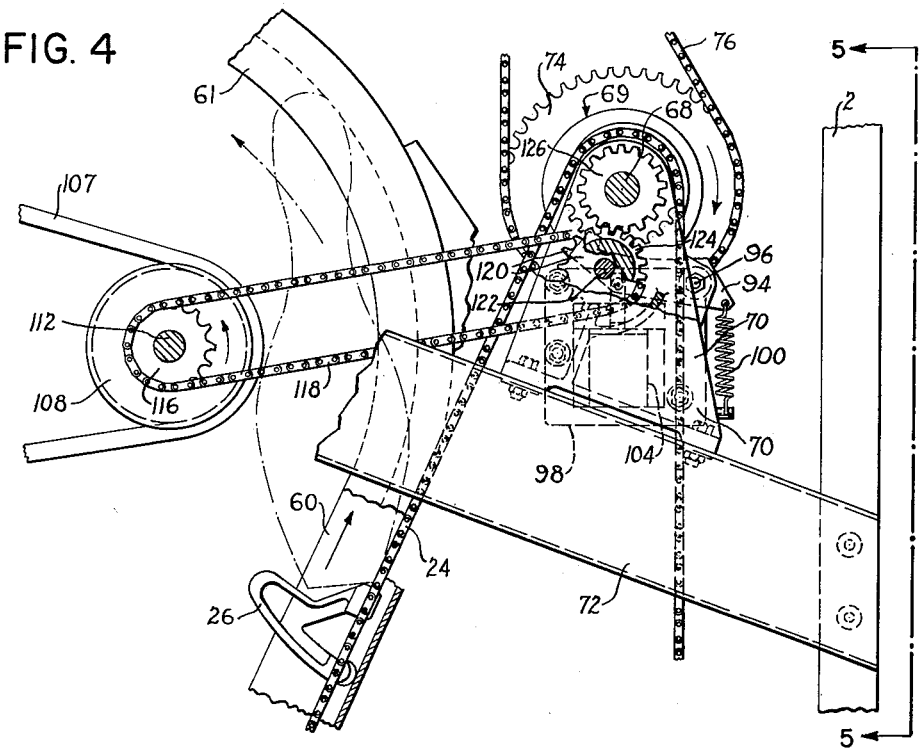
Figure 4 is a detailed view of the pin elevating conveyor drive taken on line 4—4 of Figure 3.

Sprockets 32 at the upper end of elevator E are mounted on shaft 68 journalled in bracket 70 fastened to the upper flanges of spaced transverse channel members 72 of the frame (Figure 4). One end of shaft 68 mounts a combined coupling and drive device or clutch 69 which includes a sprocket 74 tracked by a chain 76 driven from sprocket 78 mounted on the main drive shaft 80 operatively supported in a bracket 82 secured to the frame of the machine.

Shaft 80 is driven in proper timed relation from motor 81 (Fig. 19) in order to actuate conveyor E and its associated conveyors in proper timed relationship during the operation of the machine.

Figure 5:
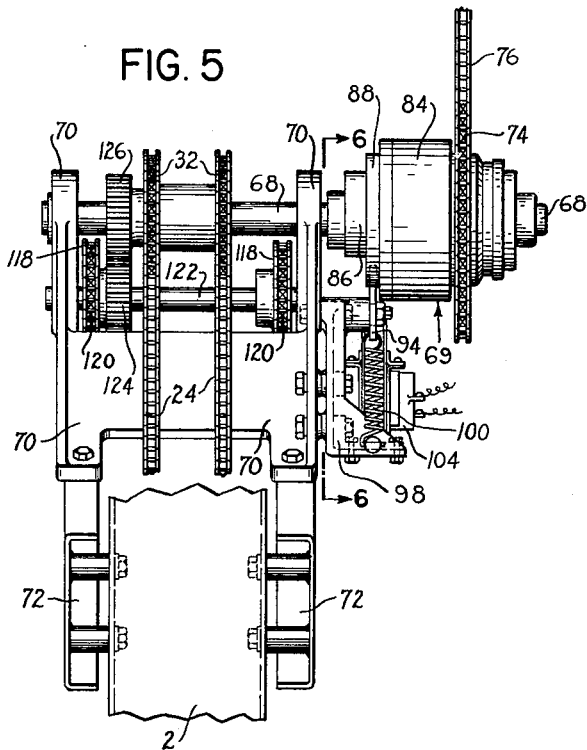
Figure 5 is a view taken on line 5—5 of Figure 4.
Figure 6:
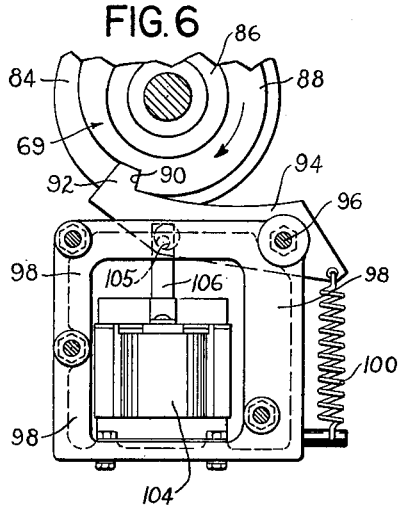
Figure 6 is an elevation taken on line 6—6 of Figure 5.

Clutch 69 may be of any suitable well known type. A preferred form is a one-revolution clutch of the type made by the Hilliard Corporation, 512 Fifth Avenue, New York, New York, described in Clutch Bulletin 239, page 2. In general, the clutch consists of a driving, and a driven member, which are coupled and uncoupled in well known manner when it is desired to drive or stop the movement of conveyor E and other mechanisms associated therewith. Driving member 84 is loosely mounted on shaft 68; coacting driven portion 86 is fixed to shaft 68. Sprocket 74 which is associated with driving portion 84 may be formed integrally therewith or secured thereto in any suitable manner. Driven part 86 includes a cam 88 having a tooth 90 arranged to engage with a tooth 92 on a clutch operating lever 94 pivoted at 96 on a mount 98 at one side of bracket 70 (Figure 5). A spring 100 having one end attached to lever 94 and the other secured to a pin in mount 98 urges tooth 92 towards cam 88 for engagement with tooth 90 thereof.

The operation of elevator E continues so long as tooth 92 is held out of engagement with tooth 90 on cam 88. This is effected by means of solenoid 104 which is provided with an armature 106 pivotally connected at 105 to lever 94. During the operation of elevator E, solenoid 104 is energized. However, in the operation of the machine, if it is desired to interrupt the rotation of shaft 68 and stop movement of elevator E, solenoid 104 is deenergized whereupon spring 100 swings lever 94 and locates tooth 92 in the path of travel of tooth 90 on cam 88. Clutch 69 is disengaged when tooth 92 engages tooth 90.

Bowling pins elevated by means of conveyor E through the medium of flights 26 may be raised either head foremost or bottom foremost. As each pin reaches the uppermost portion of conveyor E, it is guided from curved guides 61 forwardly and away from conveyor E and discharged into a pin transfer conveyor, designated generally 64.

In the embodiment selected for purposes of illustration, pin transfer conveyor 64 is so positioned with respect to the uppermost portion of conveyor E that pins are delivered one by one therefrom between spaced conveyors, such as endless belts 107 running on pulleys 108, 109 and 110.

Belts 107 are so mounted that each pin delivered therebetween will tend to swing upon the belts into butt end up position with the head portion thereof depending downwardly between the belts and supporting channels or braces 72 secured to the frame of the machine. In this manner each pin discharged from pin transfer conveyor 64 will be arranged in handle end down position as indicated in Figure 2.

Belts 107 preferably are substantially polygonal in cross section and are so arranged that similar tapered sides thereof engage the tapered faces of the portion of each pin between the maximum diameter and the neck thereof. As shown in Figures 2 and 4, the pin supporting and conveying laps of belts 107 are inclined upwardly from the point of delivery of a pin from conveyor E to the discharge station above and adjacent the pin assembling conveyor, described in detail hereinafter.

The distance between belts 107 is always greater than the maximum diameter of the head of a bowling pin but less than the maximum diameter of the belly portion thereof. Belts 107 are driven in the direction of arrow 111 (Figure 2). Pulleys 108 which support belts 107 are fixed to aligned stub shafts 112 (Figure 3). Pulleys 109 are secured to stub shafts 114 journalled in transverse channels 72. Pulleys 110 are journalled in supports 113 slidably mounted on rods 115 suitably attached to cross channels 72. Blocks 113 are urged by springs 117 outwardly towards plates 119 fixed to the free ends of rods 115. In this manner the proper yielding tension is maintained at all times in belts 107 and all slack is automatically taken up.

Attached to shafts 112 are sprockets 116 on which run sprocket chains 118 tracking sprockets 120 fixed to shaft 122 journalled in bracket 70. Shaft 122 has secured thereto a pinion 124 meshing with pinion 126 fast to shaft 68. It is evident that whenever elevator E is operated, belts 107 of conveyor 64 are also driven through the connections just described.

Although due to the spacing and type of belts 107 employed for conveying pins delivered thereto by conveyor E to a discharge position for delivery into a pin transport device, such as assembling conveyor 66, each pin tends automatically to assume a head-down position, indicated in dotted lines in Figure 2, mechanism is also provided for insuring that all pins are so delivered. Curved guide member 128, suitably attached to a side frame of the machine and hood 129, projecting into the path of travel of bowling pins along conveyor 64 acts to displace each pin sideways as it is discharged from belts 107. In this way each pin is positioned for proper delivery at station L into a pin holder 164. Also acting in conjunction with the curved guide 128 is a positively driven belt 130 driven in the direction of arrow R (Figure 2) which exerts a frictional pull or drive upon the head of each pin being discharged from belts 107 into pin assembling conveyor 66 such that each pin is given a positive push downwardly in the direction of the dotted arrow shown in Figure 2 into a pin holder forming a part of the pin assembling system.

Pin positioning conveyor 130 runs on idler pulley 132 and driving pulley 134. Pulley 132 is supported on shaft 133 suitably journalled in bracket 136 mounted on the machine frame. Pulley 134 is mounted on shaft 135 also suitably supported in bracket 136.

Pulley 134 is driven during the operation of conveyor 64 by means of a sprocket chain running on sprocket 138 attached to shaft 135, which sprocket chain also runs on sprocket 140 fixed to shaft 142 journalled in bracket 136 and sprocket 144 fixed to one end of one of the shafts 114. In this manner whenever a pin being advanced to the pin assembling conveyor 66 by conveyors 107 is positioned so that its head or handle portion is not properly disposed for delivery into an empty holder 164, the pin is displaced sideways so that the head is aligned relative to the center of the empty holder 164 by guide 123 and the head end thereof bears against a lap of conveyor 130 driven at a higher rate of speed than conveyors 107 which gives the head end of the pin a sharp push downwardly thereby directing it over guide 146 into an empty holder 164 of conveyor 66.

Guide 146 is provided with a curved surface 147 located adjacent the point of delivery of a pin into a holder 164. Guide 146 is suitably mounted on a channel member of side frame 2, as shown in Figure 2.

Bowling pins which pass head foremost from elevator E into transfer mechanism 64 are caused to travel head foremost along the same towards the point of discharge described above. Any bowling pins which are received butt end foremost by conveyor belts 107 assume a position, as they travel, in which the head portions thereof are positioned forwardly in the direction of travel prior to the time such pins arrive at the point of discharge. This action is accomplshed by the combination of momentum due to the speed of belts 107 and gravity. The spacing of belts 107 and the relatively small area of contact thereof with the belly portion of each pin provide substantially spaced points of contact or pivots about which each pin can turn due to momentum and gravity as it is conveyed by conveyors 107 to the point of discharge.

Mounted on channels 72 and extending lengthwise between the respective sets of pulleys 108, 109 are two spaced vertical plates 148, the inner faces of which are disposed approximately in the planes of the inner faces of pulleys 108, 109. Actually the cross section of belts 107 is such that their inner edges are positioned to overhang slightly the planes of the faces of the pulleys and plates 148 so that pulleys 108, 109 do not obstruct the proper movement of pins being conveyed by belts 107. Plates 148 act to confine the pins and prevent them from tipping laterally relative to the path of travel towards channels 72 where they might, for example, strike against pulleys 109 or otherwise become jammed in conveyor mechanism 64.

To assist in maintaining the upper runs of belts 107 in substantially parallel movement and to prevent them from being spread apart by the weight of pins carried thereby, the upper flanges of the channels 72 have secured thereto inwardly directed belt guiding strips 150, the cross section of which is such that the belts may have a running fit therein.

In order to prevent pins traveling along conveyor mechanism 64 from becoming dislodged therefrom by upward movement or being turned end for end, an inverted U-shaped hood 129 is provided. This hood includes two similar spaced upright flanged side plates in the bottom of which are lugs secured to cross frames 72.

As mentioned hereinabove, one of the main problems solved by this machine is that of so handling and arranging bowling pins that, regardless of variations in the maximum diameter of pins or changes in length due to dressing down and repairing such pins, pins conveyed to the receiving or station M will be positioned with their longitudinal axes substantially equil-distant from the axes of adjoining pins similarly delivered to station M. In this manner the pin transfers N which remove the pins from the holders 164 of the pin assembling mechanism 66 can properly grip, remove the pins from the holders and deliver them to spotter units 99 on table 101 for placement on the playing bed of alley G.

Another problem which is solved is that of making it possible to use only the number of pins required for play, normally two full sets of pins. It is, therefore, unnecessary to break sets of pins for answering the needs of the machine insofar as the receiving station M is concerned.

The preferred form of pin assembling unit is shown in Figures 1, 2, 3, 7, 8 and 9. The pin assembly unit consists of two vertically spaced, horizontally positioned endless chain conveyors 156 running on driven sprockets 157 and idler sprockets 158 and 159 secured to vertical driving and driven shafts 160 and 161, respectively, supported in bracket 155 and suitable bearing brackets on top cross members 162, which are suitably attached to the frame of the machine. Shaft 160 which supports sprockets 157 may be made up of two aligned shaft units coupled together by a flexible shear coupling 149.

The triangular path of movement disclosed is employed because it makes possible a simple arrangement whereby pins can be delivered one by one into a plurality of cups or holders attached to the endless conveyors forming the mechanism and then moved into straight line assembled relationship for delivery to a pin spotter. If desired, a different path of movement in a closed path could be employed.

Attached to chains 156 and equidistantly spaced therealong are pin supporting cups or holders, designated generally 164. In the embodiment shown there are ten cups or holders 164. It is obvious, however, that any desired number of cups necessary for supporting the minimum number of pins required by the rules of the game could be provided.

Figure 9:
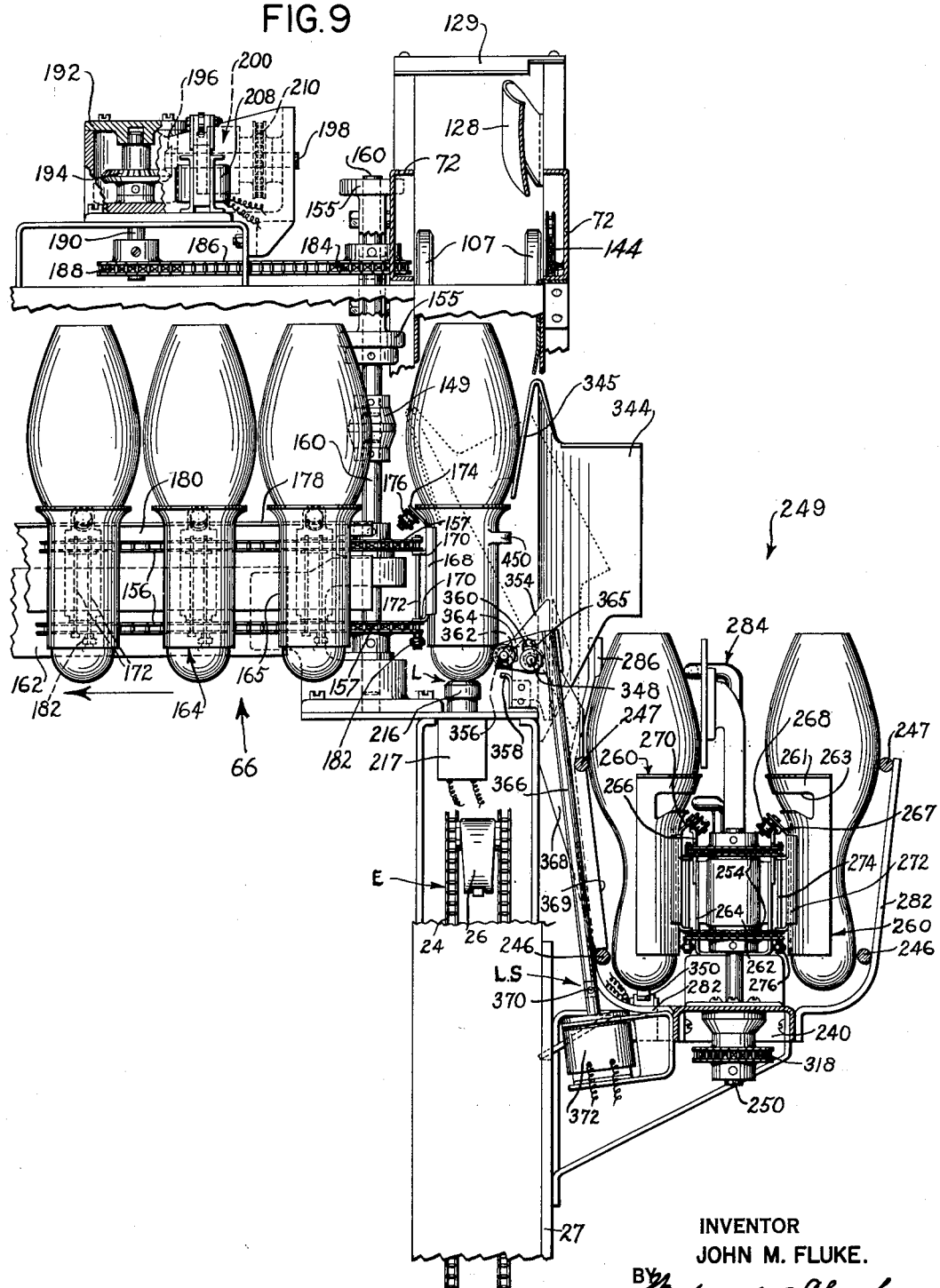
Figure 9 is a side elevation of the pin storage device in relation to the pin distributing device.

Each cup has a substantially cylindrical body 165 having an inside diameter greater than that of the handle or head end of a pin to be handled thereby in order to insure that each handle or head portion of a pin can enter freely and be disposed and supported properly in a cup 164. As shown in Figure 9, for example, each cup 164 is provided with a curved, upwardly flaring flanged part which assists in the vertical positioning of each pin deposited in a cup 164 and also tends to hold each pin in proper vertical arrangement during the step by step loading of the several cups and the final transfer of all loaded cups to the pin receiving station M where the desired number of pins, usually ten, is removed by pin transfers N and placed in pin spotters 99. Disclosure and description of the construction and operation of transfers N and the spotting and respotting mechanism which sets and resets pins on a bowling alley G are limited herein to a minimum since the specific elements of these mechanisms form no part of the invention. The structure of transfers N and the spotting and respotting mechanism is substantially the same as that shown in the above-referred to Rundell patent.

At the proper time during the operation of the machine, frame F which supports the transfers N, ten in number, moves downwardly under the action of a cam (not shown) to cause ten aligned transfer grippers N to grip aligned pins at station M. Continued rotation of this cam causes grippers N to move upwardly thereby removing pins from cups 164. By means of another cam 297 mounted on shaft 299, transfers N are moved along frame F and dispose the pins held therein in triangular arrangement above spotters 99. Further operation of the cam, which effects the raising and lowering of frame F causes transfers N to locate the handle ends of pins carried thereby in spotters 99 where they are gripped and held so that as transfer frame F rises, the pins remain in spotters 99. Since the mechanism for operating transfer frame F and grippers N is the same in construction and operation as that shown in the above referred to Schmidt Patent 2,578,319, further description and showing are omitted in the interest of brevity. The construction and operation of spotters 99 can be the same as shown and described in Rundell patent, No. 2,310,996.

During the continued operation of the machine, table 101 is lowered and turned and pins are left in spotted arrangement on the alley. Movement of table 101 to and from alley G is effected by suitable means, such as cables 301 attached to blocks 303 slidably supported in guides in side frames 2. Cables 301 are also attached to sheaves 305 on shaft 307 which mounts a pinion 309. A rack 311 meshing with pinion 309 carried by rod 317 is reciprocated in proper timed relation to accomplish the proper movement of table 101 by means of lever 323 on which is mounted a cam follower 341 tracking cam 343 on shaft 299. Since the mechanism just described is substantially the same in construction and operation as that disclosed in Schmidt Patent 2,578,319, further description and showing herein is deemed unnecessary.

As shown in Figure 9, each cup is rigidly fastened in vertically upright position to a bracket 168 having upper and lower lugs 170 projecting therefrom through which pairs of pins 172 pass connecting the cup brackets 168 to chains 156 in spaced relation along chains 156. At its upper end, each bracket 168 has an angular offset portion 174. As illustrated, this offset is substantially 45° from vertical and supports a roller 176 positioned to travel along the upper curved edge 178 of guide plates 180 stationarily supported in the triangular form, as shown in Figure 3, in order to support and maintain the cups whether loaded or empty in upright position in their travel in a polygonal closed path in the direction of the arrows shown in Figure 3.

Plates 180 terminate adjacent each of the sprockets on which chains 156 run. One of each of the sets of pins 172 carries at its lower end a roller 182 adapted to run along the outer upright faces of channels 162 and guide portions 163, 166 in order to assist in maintaining the loaded and unloaded cups in substantially vertical upright position at all times.

In order to maintain proper tension in the conveyor system 66, which includes chains 156, a resilient slack take-up is provided. This device consists of two pivoted chain guide portions 163, 166 which form the longest side of the triangular path of movement along which chains 156 travel (see Figure 3). Guide portions 163 and 166 at one end are attached to brackets 169 hingedly mounted on shafts 160, 161, respectively. At the free end of guide portion 163 is secured a U bracket 165 having mounted between its arms a shaft 171 on which are mounted spaced idler take-up sprockets 151. The spaced free ends of U bracket 165 support stub shafts 173 (one of which is shown in Figure 3) forming pivotal connections for spaced parallel links 152 (one of which is shown in Figure 3) pivotally connected by a shaft 153 to spaced arms of bracket 167 fixed to the free end of the other guide portion 166. The pivot shaft 153 carried by bracket 167 also supports two spaced idler take-up sprockets 154.

Mounted in channel 162, adjacent to guide portions 163 and 166, and engaging a part of bracket 165 is a pin 175 about which is located a coiled expansion spring 177. Pin 175 is provided with a head or disk at one end by means of which it is attached in any suitable manner as by welding to bracket 165. See Fig. 3. One end of this spring bears against the vertical web of channel 162; the other end of spring 177 bears against the head of pin 175 in a manner to urge the free ends of plates 163, 166 about pins 173.

Sprocket 184 which drives shaft 160 in order to locate empty pin holders or cups 164 in pin receiving position relative to transfer mechanism 64 and to effect the delivery of ten loaded cups to pin receiving station M is driven by means of sprocket chain 186 which runs on sprocket 188 secured to shaft 190 journalled in a gear box 192 mounted on a suitable cross member of the machine. Shaft 190 mounts a bevelled gear 194, Fig. 9, which meshes with bevelled pinion 196 secured to one end of a horizontal shaft 198 having two parts, one a driving and one a driven portion coupled by a one-revolution clutch 200. Clutch 200 may be similar in construction and operation to clutch 69 described hereinabove. Clutch 200 has a cam 202, Fig. 3, attached to the driven part of shaft 198 which is controlled by a toothed lever 204 operative to engage and disengage a tooth (not shown) on cam 202 for coupling and uncoupling the driving and driven parts of shaft 198. Lever 204 is pivoted on housing 192, and is operatively controlled by a solenoid 208 in opposition to a pull-down spring 207. On the driving section of shaft 198 is mounted a sprocket 210 on which runs a chain 212 driven from sprocket 214 which in turn is driven by drive shaft 80 on which it is mounted.

As each bowling pin delivered from belts 107 drops into a pin holder 164 of pin assembling mechanism 66, the handle thereof strikes against a trigger 216 which closes a switch 217 in the control circuit to energize solenoid 208 and thereby effect a movement of lever 204 out of engagement with the tooth on cam 202 and cause one revolution of shaft 198 to turn shaft 160 and index conveyor 66 one step. This removes a filled holder 164 from pin receiving position beneath belts 107, and locates the next empty holder at delivery or loading station L for disposition of a pin therein.

Further movement of conveyor 66 is interrupted until a pin is delivered into the empty holder 164 located beneath belts 107. Upon completion of the operation of filling ten successive cups, conveyor 66 is moved so as to travel all ten filled cups into aligned position at station M (as shown in Figure 3) ready for the removal of pins therefrom by transfer units N on frame F, as described hereinabove.

Attached to No. 1 pin holder 164 (as shown in Figure 3) is a lug 218 constructed and arranged to coact with the several switches positioned along the path of travel of the several cups or holders 164 which assist in controlling the operation of conveyor 66. After the removal of ten pins at station M for delivery to spotter units 99, by means of a control device described hereinafter, clutch 200 is engaged to effect the drive of shaft 160 and cause the empty pin holders 164 to travel from station M along that portion of the triangular path (shown in Figure 3) which extends between shafts 161, 160, and thereby locate No. 1 pin holder 164 in position to receive the next pin delivered by conveyors 107 to delivery or loading station L. As No. 1 pin holder moves into receiving position at station L, lug 218 engages trigger 220 (Figure 8) of switch 222 suitably secured to the frame of the machine.

The operating mechanism is so constructed that conveyor belts 107 cannot operate until No. 1 empty pin holder has been located at station L. This includes a control described in detail hereinafter, which operates in conjunction with the driving mechanism of the conveyor 66 and prevents operation of pin transfer conveyor belts 107 until No. 1 empty pin holder has been located at station L.

The opening of switch 222 breaks the circuit through solenoid 208 thereby deenergizing the solenoid. Spring 207 moves lever 204 to position the tooth on lever 204 for engagement with the tooth on cam 202 whereupon clutch 200 is disengaged, the drive of shaft 160 interrupted and No. 1 empty holder 164 is positioned for delivery of a pin thereto at station L directly over switch operating trigger 216. During the successive delivery of individual pins by belts 107 into the several empty cups on conveyor chains 156, engagement of the head end of each pin deposited in a holder 164 with trigger 216 will cause an intermittent drive of shaft 160 and effect a stepwise movement of loaded cups from station L and empty cups into position for delivery of pins thereto at station L.

The step by step movement of conveyor chains 156 continues until the tenth pin or last pin of a set is placed in holder No. 10. At the time empty holder No. 10 is located at station L, lug 218 which is mounted on holder No. 1 is positioned for engagement with trigger 224 of control switch 226. As soon as chains 156 begin their movement following the deposit of the last pin of a set or No. 10 pin in No. 10 holder, which energizes solenoid 208 of the conveyor driving mechanism, actuation of switch 226 as the result of the engagement of trigger 224 by lug 218 causes continued energization of solenoid 208 until all of the filled holders 164 have been positioned in aligned arrangement at station M awaiting removal of the pins therefrom and their delivery to pin spotter units 99. As the several loaded pin holders 164 move into their positions in station M, lug 218 engages trigger 228 of switch 230 and causes a deenergization of solenoid 208 at substantially the time pin holder No. 1 moves to its dwell position in station M whereupon all of the loaded pin holders 164 are located in proper aligned relationship relative to transfers N which deliver them to the spotter units 99.

The several switches arranged along the path of travel of holders 164 preferably are adjustably mounted on brackets secured to the frame of the machine. The adjustable mounting of each of the switches makes it possible to so position each switch that empty holders are properly located at station L, and filled holders are accurately positioned at station M for delivery of pins to spotter units 99.

Figure 19:
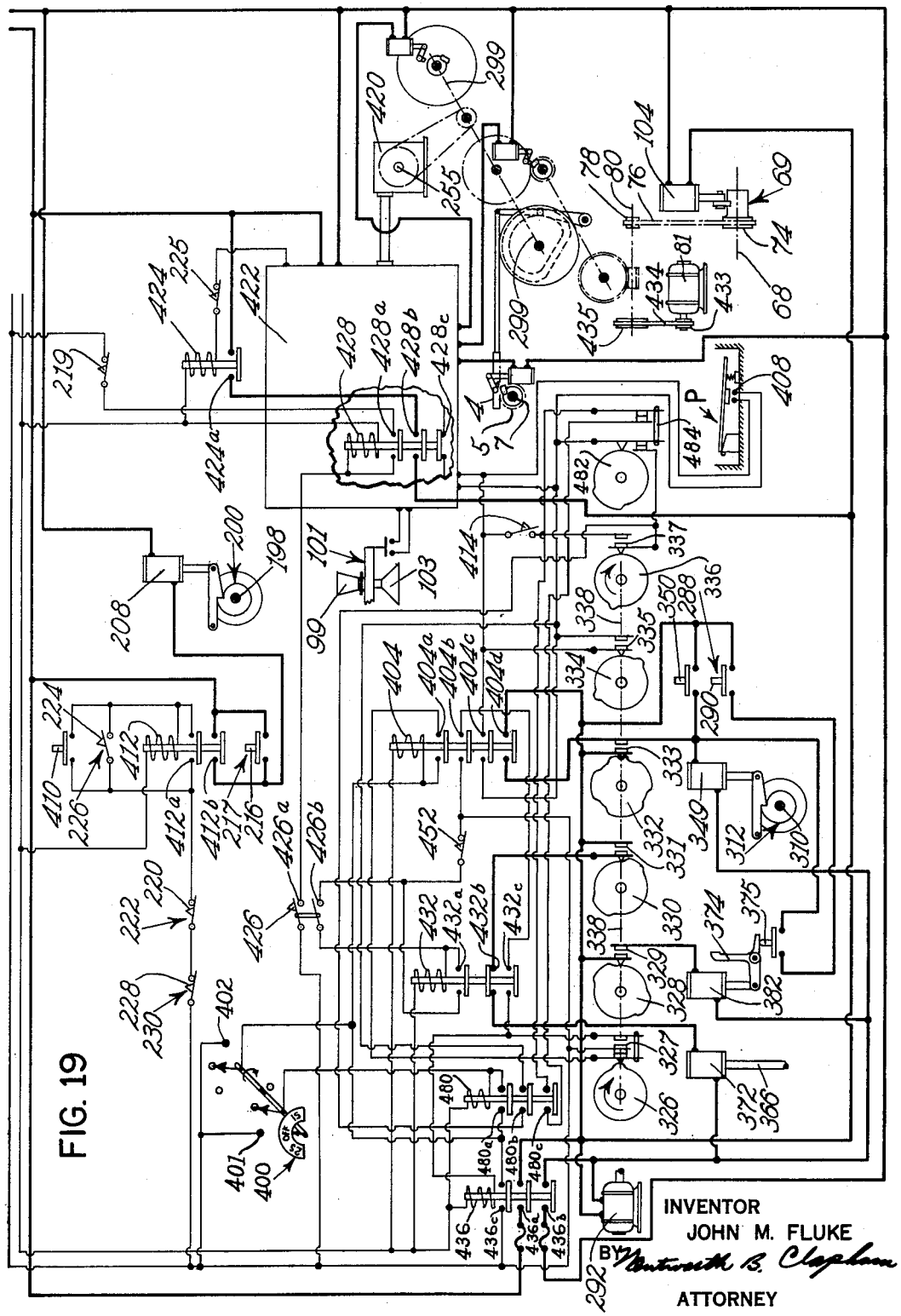
Figure 19 is a wiring diagram showing a suitable circuit for controlling the operation of the several parts of the machine.

Since all ten cups are filled there is no necessity for continuing the operation of either elevator E or pin transfer conveyors 107 and, therefore, as lug 218 engages trigger 224 it also engages switch trigger 219 (Figure 19) which deenergizes solenoid 104 of clutch 69 and throws out the back end conveyor operating mechanism. Movement of the filled cups into aligned position at station M causes lug 218 to engage trigger 228 of switch 230 (Figure 19). Actuation of trigger 228 causes an opening of switch 230 and a breaking of the circuit through solenoid 208 thereby interrupting the drive of shaft 160 which stops the movement of conveyor 66.

The present invention provides a solution of the problem of automatically accomplishing in a bowling pin setting machine the changeover and substitution of the pins of one set for pins of another set. For example, if "open play" pins have been handled and spotted on a bowling alley for one or more games and the bowling alley proprietor finds it desirable that these pins be removed from the machine and replaced by pins in reserve, by means of the mechanism described herein, all operations incident to the substitution of pins are accomplished automatically with a minimum loss of time to the operator and delay to the players.

The pin storage mechanism includes an endless conveyor system, designated generally 249 consisting of two spaced endless chain conveyors 256. Drive shaft 250 supports two vertically spaced driving sprockets 254 on which chains 256 run, which chains also engage vertically spaced sprockets 258 on driven shaft 252. Attached to endless chains 256 and spaced equidistantly therealong is a plurality of pin holders or cups 260. Since in the machine described, two sets of pins are used, twenty cups 260 are provided in order to hold in reserve a number of pins corresponding to those in play in the machine. Although a set usually consists of ten pins, it is obvious, if desired, more or less could be used in which case the number of cups 260 would vary accordingly.

Figure 8:
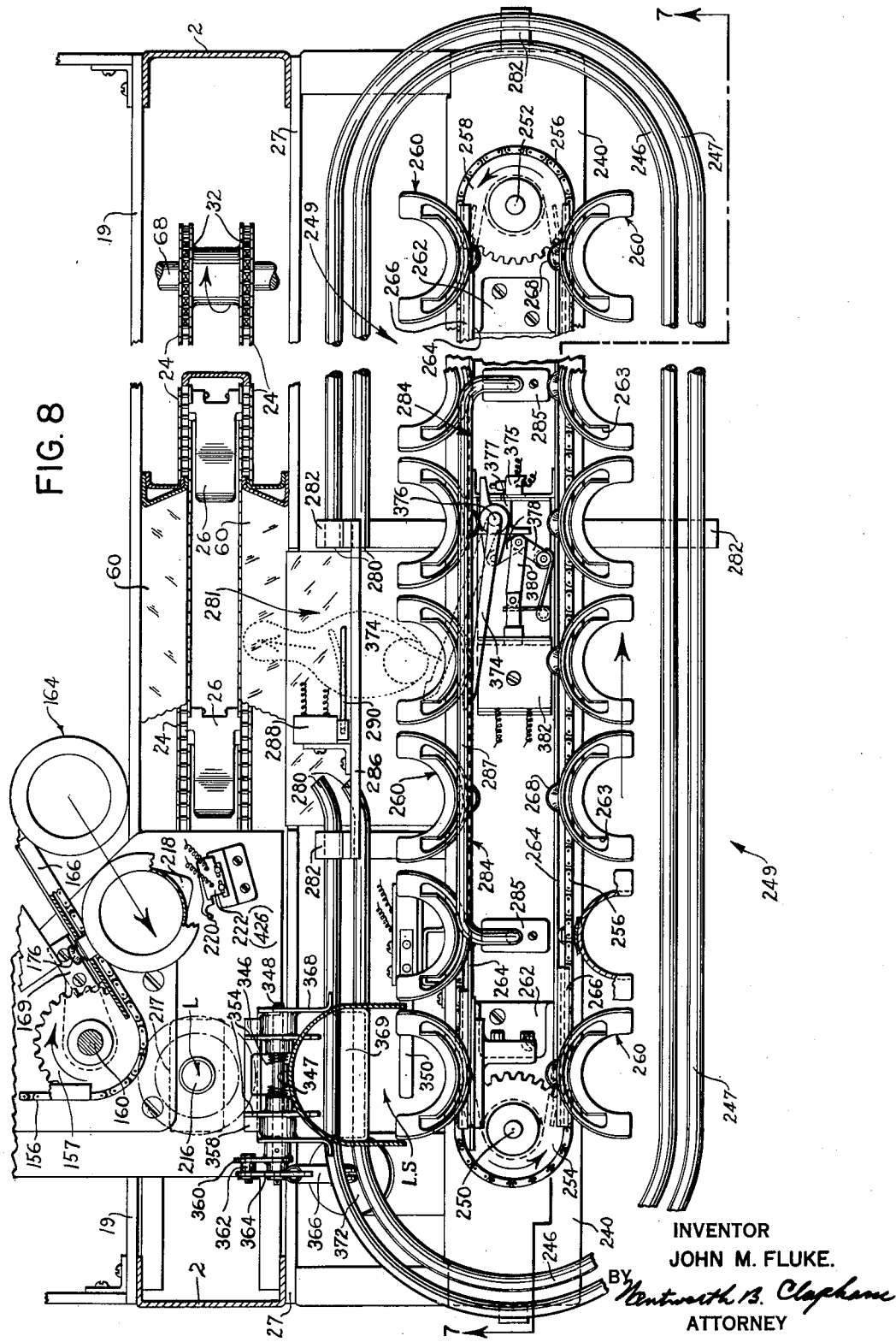
Figure 8 is a plan view of the same including a partial section of the rear of the pin distributing device.

Attached to brackets 262 which provide bearings for shafts 250 and 252 are vertically positioned parallel plates 264. These plates extend between shafts 250, 252 (as shown in Figure 8) and provide supports for plates 266 having a top edge flared portion 267 on which run rollers 268 rotatably mounted on extensions 270 formed in brackets 272 (Fig. 9). The latter, which are fastened to cups 260, are secured by pins 274 to chains 256 and travel therewith in a manner similar to the mounting of cups 164 described hereinabove. One of the pins 274 of each bracket is provided with a roller 276 (as shown in Figure 9) adapted to roll along plates 264, and in conjunction with roller 268 maintain each cup 260 in proper vertical position at all times for delivery and removal of bowling pins therefrom.

Each cup 260 consists of a semi-cylindrical member or half-cup having at its upper end an outwardly flared portion 261 provided with transverse slot 263. The purpose of slot 263 will be described hereinafter. Members 260 are mounted along chains 256 with their open sides facing outwardly. Rails 246, 247 coact with cups 260 and confine pins therein.

As shown in Figure 8, rails 246, 247 at each end of storage device 249 have substantially semi-circular portions concentric with the axes of shafts 250, 252. In this manner pins can be supported by members 260 and rails 246, 247 as chains 256 move in an endless closed path through device 249 in the operations of storing and delivering pins. At one side of storage device 249 adjacent the bowling pin spotting machine, rails 246, 247 are cut away, as at 280, thereby forming an ejecting or discharge station, and are secured to brackets 282 suitably attached to channel 240. The opening 281 provided between rails 246, 247 furnishes a space through which pins in reserve can be delivered to the bowling pin setting machine, and more specifically to conveyor E during pin changing operations.

Extending parallel with and above one of the plates 264 is a section of horizontal rail 284 substantially U-shaped in formation with the arms of the U secured to brackets 285 mounted on channel 240.

The horizontal portion 287 of rail 284 which is positioned opposite discharge opening 281 assists in maintaining pins in cups 260 in proper substantially vertical arrangement. Opposite rail 284 and substantially parallel thereto is mounted a bar 286 having its ends secured to brackets 282. Bar 286 which assists in holding pins in cups 260 also carries a switch 288 from which depends an operating finger 290 so disposed as to be engaged successively by pins being discharged from cups 260 for delivery to conveyor E. Thus, if a pin becomes jammed or fails to tip far enough out of a cup 260 to fall out therefrom, switch 288 is not actuated. This prevents a further indexing of chains 256 and cups 260 under actuation of a one-revolution clutch 312 described hereinafter which controls the step by step movement of chains 256.

Chains 256 are driven by motor 292 supported on channel 240 (see Figure 7). Motor shaft 294 carries a pulley 296 connected by belt 298 to pulley 300 loosely mounted on a stub shaft 302 suitably supported on the underside of channel 240 and depending therefrom. Secured to pulley 300 is a pulley 304 on which runs belt 306 also running on and driving pulley 308 supported on shaft 310 on which is mounted a one-revolution clutch 312 which may be similar in construction and operation to clutch 69 described hereinabove. Further detailed description thereof is deemed unnecessary.

A sprocket 314 mounted on shaft 310 is connected by chain 316 to a sprocket 318 fixed to the lower end of shaft 250 and operative to drive chains 256 by means of sprockets 254 supported on shaft 250. Clutch 312 is actuated to operate one revolution at a time in order to drive chains 256 step by step and thereby present cups 260 for loading and discharging pins. Under certain conditions described hereinafter, clutch 312 can be actuated so as to effect a continuous drive of shaft 310 for a predetermined number of revolutions.

Clutch 312 consists of driving and driven parts 313, 315, respectively. Clutch 312 can be actuated to operate one revolution at a time in order to drive shaft 250 and advance holders 260 stepwise to a point adjacent loading station L where pins are delivered thereinto. Under certain conditions, described more in detail hereinafter, clutch 312 is held in order to drive shaft 250 through a plurality of revolutions.

Figure 10:
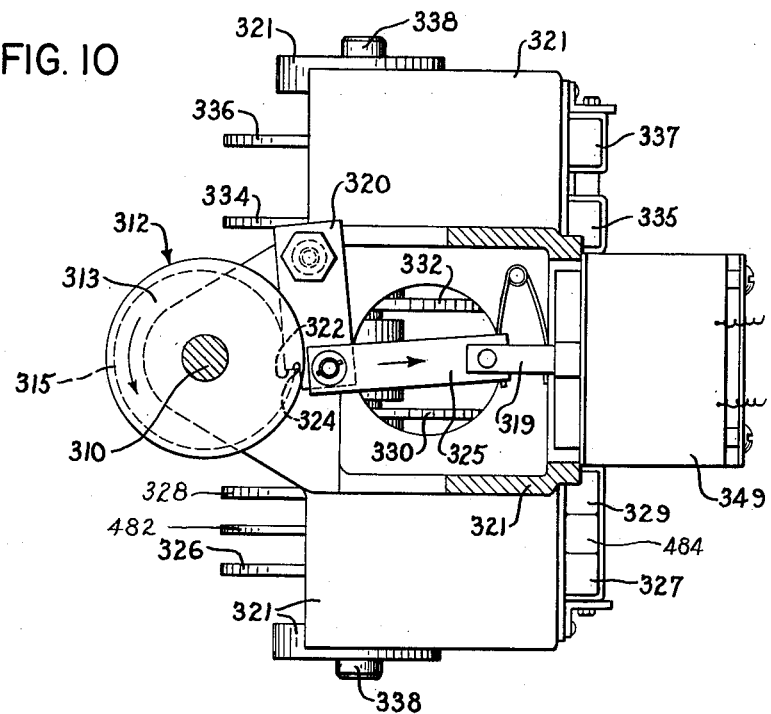
Figure 10 is an enlarged view of the pin storage indexing mechanism taken on line 10—10 of Figure 7.

The mechanism for controlling the operation of clutch 312 includes a clutch throw-out lever 320 (Fig. 10) pivotally supported on bracket 321 fastened to the underside of channel 240 and provided with a tooth 322 adapted to engage with a tooth 324 on driven part 315 when the clutch is thrown out. Lever 320 is pivotally connected by link 325 to armature 319 of solenoid 349.

The operation of the storage and pin changing mechanism is controlled by a series of cams 326, 328, 330, 332, 334, 336 and 482 (see Figures 7, 10 and 11), all of which cams are mounted on a shaft 338 journalled in bracket 321 fastened to channel 240. Shaft 338 has secured thereto a worm wheel 340 which operatively engages a worm 342 formed on the lower end of shaft 310 for effecting rotation of shaft 338, and cams 326, 328, 330, 332, 334, 336 and 482 mounted thereon.

Figure 11:
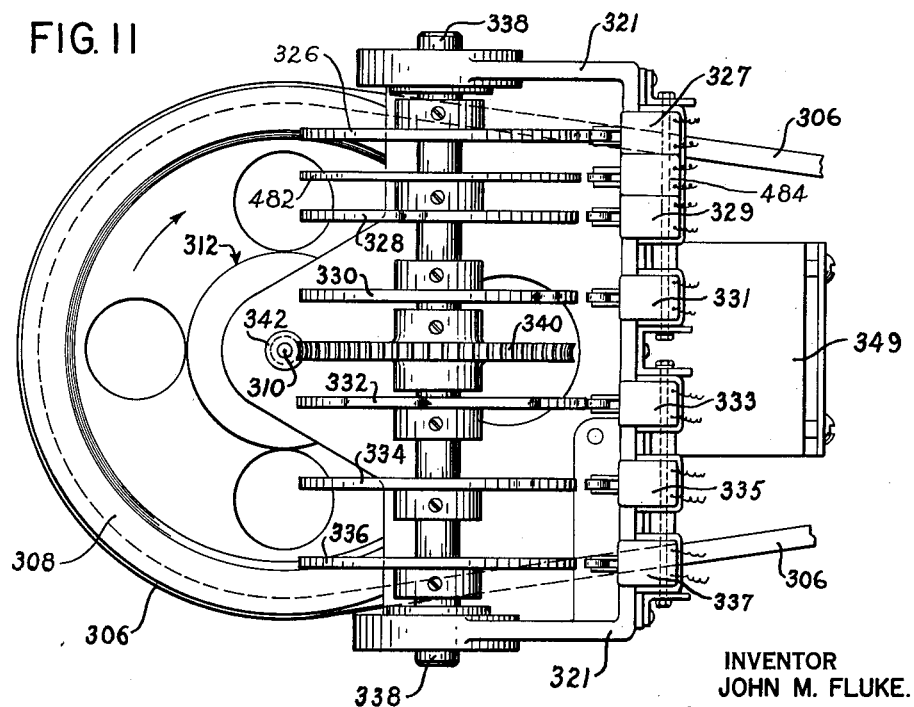
Figure 11 is an enlarged view taken on line 11—11 of Figure 7.

Mounted on bracket 321 is an aligned series of seven switches which may be of the well-known micro-switch type. As shown in Figure 11, switches 327, 329, 331, 333, 335 and 337 are positioned in line with cams 326 to 336, inclusive, so that cam 326 coacts with switch 327; cam 328 coacts with switch 329, etc.; switch 484 is positioned in line with cam 482. The cooperative engagement between cams 326–336, inclusive, and switches 327–337 and switch 484 with cam 482 is such that one of the several switches is actuated by a particular cam at a particular time in the cycle of operations of the machine and the storage devices. The operation of these switches is described more in detail hereinafter in connection with a description of the electric circuits employed.

Referring to Figure 9, it will be recalled in view of the description hereinabove that each time a pin drops into a cup 164 at station L, a switch 217 is operated by the engagement of the pin head with trigger 216 to close a circuit through a solenoid 208 to index conveyor chains 156 of the pin assembling conveyor 66 a distance sufficient to locate an empty holder 164 at the loading station pending arrival of the next pin and its deposit in the empty holder.

Under normal operating conditions during play of a game, the pin storage device is inoperative and contains two sets of ten pins, which in Figure 12 are designated C and D. Figures 7 and 8 show only supporting cups sufficient to hold fourteen pins. The other cups have been omitted in order to conserve space. Diagrammatic Figure 12, however, illustrates the relative arrangement of twenty pins forming two full sets supported in two substantially parallel straight lines in storage device 249.

Referring to Figures 1, 2 and 9, it will be seen that the preferred position of the pin storage mechanism, designated 249 and the several pin supporting cups 260 is below the position occupied by the several cups 164 of the pin assembly mechanism. In this way, pins diverted from cups 164 can move by gravity downwardly and into cups 260 for storage. The pin delivery position or station LS for pins being diverted from pin assembly conveyor mechanism 66 into storage 249 is substantially in the same vertical plane and alongside but lower than station L (Fig. 2). In order to divert pins from movement from belts 107 into cups 164 there is provided a deflector or guide 344 arranged between stations L and LS. Under normal operating conditions, when pin changing and storage device 249 is inoperative, deflector 344 is maintained in substantially a vertical position (shown in full lines in Figure 9) out of the path of travel of pins from belts 107 to station L. Deflector 344 is maintained in inoperative position by means of spring 346 (Fig. 8) mounted on pivot shaft 348 which supports the deflector for swinging movement.

When it is desired to interrupt the delivery of pins into cups 164 and direct them into holders 260 in order to remove pins from play and place them in storage, deflector 344 is shifted to dotted line position (shown in Figure 9) against the action of spring 346 having a tail portion 347 which bears against a part of deflector 344 and normally maintains it in substantially vertical position. This operation locates deflector 344 in position to receive all pins being delivered by belts 107 from conveyor E and because of the general U-shape cross section of deflector 344 (see Figure 8) each pin is guided downwardly into a cup 260 of the storage conveyor mechanism. As each pin enters a cup 260 at station LS, the head end thereof strikes a "pins-in" switch 350 which effects the energization of solenoid 349 which actuates clutch 312 to drive shaft 250 and chains 256 and move the filled cup 260 from receiving station LS and locate an empty one in its place pending disposition of the next pin therein. Deflector 344 is provided with a guide portion 345 which coacts with guides 146, 147 in guiding pins delivered by conveyors 107 into proper position in holders 164. Movement of deflector 344 into pin diverting position is limited by means of spaced plates 354 attached to deflector 344 provided with shoulders 356 which engage a transverse stop 358.

The mechanism for shifting pin deflector 344 from its inactive position (shown in full lines in Figure 9) to operative pin deflecting position includes a forwardly extending arm 360 secured to one end of a pivot shaft 348 and having at its free end a pin and roller 362. Straddling roller 362 is the forked end of a plate 364 fixed to the upper end of a reciprocable rod 366. Plate 364 is provided with a slot 365 in which rides the turned down end of shaft 348 which is mounted in a substantially U-shaped bracket 368 secured to bars 246, 247. The center part 369 of bracket 368 forms a continuation of deflector 344 and prevents pins en route to cups 260 from falling downwardly between bars 246, 247. The lower end of rod 366 is pivotally connected at 370 to the armature of solenoid 372. When solenoid 372 is energized, the downward movement of rod 366 causes the forked end of plate 364 attached to rod 366 to effect a downward force on roller 362 which causes arm 360 to move downwardly, in a counter-clockwise direction, thereby moving deflector plate 344 from the full line to the dotted line position as viewed in Figure 9.

During the transfer of pins from holders 260 of storage device 249, pins pass from holders 260 through opening 281 for delivery to conveyor E. The mechanism which assists in removing pins from holders 260 consists of a finger or cam 374 pivotally mounted at 376 in a bracket 377 mounted in the space between plates 264 and secured thereto. Finger 374 normally occupies the inoperative position shown in Figure 8 where it is held out of the path of travel of pins supported by cups 260 in the front or forward section of pin storage device 249 (Figure 8). Pivotally connected to finger 374 is one of a pair of toggle links 378. The common pivot of these links 378 is in turn connected to a link 380 operatively secured to the armature of solenoid 382 (Figures 7 and 8). When solenoid 382 is actuated, toggle links 378 are straightened thus swinging the free end of arm 374 forwardly into the path of movement of pins carried by cups 260 and held therein, adjacent opening 281, by engagement with bar 286 and part 287 of bar 284.

As each pin moves into engagement with the free end of arm 374, when the latter is located in pin discharging position, it will be swung outwardly away from its respective holder 260. Each pin engaged by the free end of arm 374 is, therefore, directed away from and falls from its support 260 outward through opening 281 for delivery to conveyor E. Each cup 260 is slotted at 263 in order to permit arm 374, when located in pin removing position, to project through the wall of the cup, engage a pin supported therein, and effect its removal therefrom in the manner described.

It is evident that as each pin slides and drops away from its respective support it engages trip finger 290 of switch 288. This closes the circuit operating solenoid 349 and clutch 312 and effects a stepwise movement of conveyor chains 256 to position filled cups 260 in succession at pin discharge position adjacent opening 281.

As mentioned hereinabove, the preferred form of my invention illustrated is adapted primarily for use with a bowling pin spotting machine of the type shown in Schmidt Patent 2,578,319 and Broekhuysen Patent 2,599,274. In the pin spotting machine shown in these patents, there is provided a table 101 upon which are mounted spotters 99 and respotters 103. At appropriate times during the operation of the machine, when it is desired to spot a new set of pins on the alley, the table with ten pins located in spotters 99 is turned and lowered in order to spot ten pins carried thereby in playing arrangement on the playing bed of the alley. Also at the appropriate time during the operation of the machine, after the rolling of the first ball of the frame, respotter units 103 are operated to grip, lift and respot any pins remaining standing after the throwing of the first ball. In the Schmidt and Broekhuysen patents above referred to the spotters and respotter units are operated by suction through suitable mechanism (not shown herein) for gripping and releasing the pins in order to spot a new set of pins on the alley pending the throwing of the next ball or to respot in on- or off-spot position pins which were lifted prior to the operation of sweep S.

Figures 12–18, inclusive, show diagrammatically a general schematic manner in which pins are handled in effecting a changeover from two sets of pins in play to two sets of pins in reserve or in storage. In Figure 12 normal pin arrangement is shown. The machine is ready for normal play. Pins of set A are located in playing arrangement on the alley, pins of set B are held in transfer cups 164 of the pin assembling conveyor 66 and pins of sets C and D are supported in cups 260 in two rows in storage device 249.

Assuming that it is desired to substitute sets C and D for sets A and B, reference to Figure 13 is made. In this figure pins of set A have been lifted by respotters 103, pins of set B have been transferred into spotters 99, pins of set C are being removed from storage device 249 for delivery into pin assembling conveyor cups 164 and pins of set D remain in their cups in storage device 249.

In Figure 14 pins of set A have been replaced on the alley, pins of set B remain in spotting table spotters 99, pins of set C which were delivered from storage device 249 are being moved by pin assembling conveyor 66 to storage M and the pins of set D remain in storage device 249.

In Figure 15 pins of set A have been swept into pit P, and are being delivered to storage device 249. Pins of set B have been spotted on the alley, pins of set C await delivery into spotters 99 and pins of set D remain in the rear row in storage device 249.

In Figure 16 pins of set B have been lifted by respotters 103, and pins of set C have been delivered from holders 164 of conveyor 66 to spotters 99 whereupon the holders are moved to the pin loading station to receive the pins of set D which are now being delivered from storage following the completion of the delivery of the pins of set A into storage.

In Figure 17 pins of set B have been swept into the pit and are being delivered to storage device 249, pins of set C are being located on the alley and pins of set D have all been transferred into holders 164 of conveyor 66.

Finally as shown in Figure 18, pins of set C are on the alley, pins of set D are held in pin holders 164 of assembling conveyor 66 and pins of sets A and B are in storage in storage device 249.

The operations involved in effecting the complete transfer and substitution of one or two sets of pins in the pin setting machine for two sets of reserve pins in storage device 249 can best be understood by a reference to Figure 19 which shows a suitable wiring diagram for controlling the operation of the machine, and to the steps shown schematically in Figures 12–18, inclusive, described hereinabove. For simplicity in description it is assumed that the pin spotting machine is in condition for the rolling of a first ball of a frame. Therefore, as illustrated diagrammatically in Figure 12, one set of pins A in play is standing on the alley, another set of in-play pins B is located in pin distributing holders 164 ready to be removed by grippers N and delivered to spotters 99. There are also twenty pins or sets C and D in two rows of ten in storage device cups 260.

To start the operations necessary to change two sets of pins, switch 400 is turned to position 2S (Figure 19) corresponding to changing two sets of pins to close contact 401 momentarily. Switch 400 may be any suitable type of three contact switch such as a wiper switch. It is provided with a "2S" position, an "off" position and a "1S" position. Switch 400 is located conveniently on any readily accessible part of the frame of the machine or at the front of a bowling alley or in the managers's office. When switch contact 401 is closed momentarily it causes the energization of relay 480 and closes contacts 480a, 480b and 480c which nullify the normal operation of cam 482 upon switch 484. Relay 404 is energized and locked in by its contact 404a and double throw switch 327. At the same time, contacts 404b–404b, inclusive, are closed. This action causes motor 292 and cams 334, 336 to operate in the manner described hereinbelow.

Closing of contact 404c results in what is termed a "fake ball" by shunting pit switch 408. This is the equivalent of having a bowling ball and/or bowling pins drop into pit P and actuate pit switch 408, which in normal play closes the starting circuit. This actuates the pin setting machine through a normal first ball cycle similar in operation to that described and shown in the above referred to Broekhuysen patent.

Since, however, an actual ball has not been thrown, no pins are knocked down. Therefore, when the table 101 comes down, respotter cups 103 grip the ten pins of set A which are standing on the alley and the table rises and locates spotters 99 in pin receiving position relative to pin transfer frame F. Grippers N then remove the pins of set B from the pin holders 164 at station M, and transfer them to spotters 99 on table 101. In the meantime sweep S has operated but since there were no pins on the alley, none can be swept into the pit. After sweep S returns to inactive position, table 101 is lowered with twenty pins, and respotters 103 release and respot the pins of set A on the alley. Table 101 then rises with the ten pins of set B in spotters 99 and dwells.

In the meantime, when frame F which supports grippers N moves upwardly lifting the heads of the pins of set B clear of the pin distributing holders 164, one of the longitudinal bars 35 forming a part of frame F engages and closes switch 410 thereby energizing relay 412 which is locked in by its contact 412a. Closing of contact 412b energizes solenoid 208 which allows one-revolution type distributor clutch 200 to be thrown in and effect the movement of the now empty train of pin distributing holders 164 along the diagonal side of the triangle, until lug 218 on No. 1 holder 164 engages trigger 220 and opens switch 222 thereby deenergizing relay 412 and solenoid 208, which throws out clutch 200. Movement of chains 156 is thereupon interrupted and the No. 1 cup stops at station L directly over trigger 216 of switch 217 ready to receive one of the pins which are about to be ejected from storage device 249 into the rear elevator E of the pin spotting machine.

After the removal of the pins of set B, as empty holders 164 move away from station M, lug 218 on No. 1 holder moves out of engagement with a "second ball" switch 414 and the contacts of said switch open. The function of this switch will be described later. As mentioned hereinabove, the control mechanism for operating the bowling pin spotting machine, described and illustrated herein, is of the same construction and operation as that shown and described in said Broekhuysen patent. Further detailed showing and description is, therefore, deemed unnecessary and is omitted in the interest of brevity.

As the train of empty holders 164 moves towards the loading station L, rotation of shaft 255 (Figure 19) causes a cam (not shown) which may be of the same construction and operation as shown and described in said Broekhuysen patent, in cam box 420 to close a circuit in the machine control 422 which energizes and holds in relay 424 thereby closing its contact 424a.

When lug 218 on empty No. 1 cup 164 operates switch 222, it also closes another switch 426, which preferably is mounted on the same adjustable support to which switch 222 is attached. Switch 426 has two contacts 426a and 426b. The closing of contact 426a energizes relay 428 of the machine control mechanism 422. Relay 428 is locked in by its contact 428a. The closing of contact 428b energizes the solenoid 104.

The shaft of motor 81 is provided with a driving pulley 433 on which runs a belt 434 running on pulley 435 secured to shaft 80. This shaft mounts a sprocket 78 on which runs a chain 76 driving sprocket 74 of clutch 69. At the proper time during the operation of the machine, by means of clutch 69, described hereinabove, which is actuated by solenoid 104 upon closing of contacts 428b, conveyors E and 107 are caused to operate.

At the same time that contact 426a closes, contact 426b also closes and energizes relay 432 which is held in by its contacts 432a. Contacts 432b open, thereby preventing energization of solenoid 372 which moves deflector 344 into operative position. Hence, the ten pins of set C, which are about to be discharged from storage device 249 into elevator E conveyor will be conveyed thence to conveyor belts 107 and delivered in the manner described hereinabove one by one into the cups 164 of the pin distributing conveyor 66.

Contacts 432c close and in conjunction with contacts 404b, which are closed at this time, energize and hold in relay 436. The closing of the contacts of relay 436 also energizes solenoid 480 for a purpose described hereinafter. The closing of contacts 436a and 436b also starts the storage motor 292. As the operation of the pin spotting machine stops at the end of a normal first ball cycle, a cam (not shown) forming a part of the machine control 422 referred to hereinabove, on shaft 255 in cam box 420 opens a switch (not shown) in the machine control circuit which deenergizes relay 424. However, elevator E continues operating due to the fact that relay 436 is energized by cam 326, as described hereinbelow. At this time relay 404 is still locked in and its contacts 404d are closed; therefore, storage clutch solenoid 349 is energized allowing one-revolution type storage clutch 312 to engage and effect the drive of shaft 250, which moves chains 256 and cups 260 attached thereto.

As the storage motor 292 operates, it effects the drive of the storage conveyor chains 256, and cams 326–336, inclusive, on shaft 338. As clutch cam 332 turns, it closes its switch 333 and keeps solenoid 349 energized thereby keeping the storage clutch engaged long enough to permit the first pin in the rear row of the storage conveyor, or the first of set C, to be conveyed to the opening 281 of storage device 249 where finger 374 is made operative to eject pins therefrom.

Just before the arrival of pin No. 1 of set C at the ejecting station at opening 281 (Figure 8) knock-out cam 328 closes its coacting switch 329 energizing knockout solenoid 382 thereby operating and holding ejecting arm 374 in ejecting position relative to pins engaged thereby as pin filled cups 260 travel therepast. When arm 374 is in ejecting position, it holds an interlock switch 375 closed thereby putting and holding "pins-out" switch 288 in the circuit of the storage clutch solenoid 349.

While the storage conveyor chains 256 are travelling, motor 292 and elevator cam 326 operate double throw switch 327. This deenergizes relay 404 opening all its contacts. Operation of switch 327 also provides an alternate circuit to keep relay 436 energized to keep the rear elevator E operating and storage motor 292 running.

The rotation of cam 332 opens switch 333 and stops storage conveyor 249 with the first of the cups 260 holding pins of set C at the ejecting station. Opening of switch 333 permits the storage clutch 312 to be operated at this time, only by the "pins-out" switch 288.

The ejection of the first pin of set C by ejecting arm 374 closes switch 288 momentarily energizing clutch solenoid 349 which allows storage clutch 312 to engage and advance the pin storage conveyor chains 256 one cup at a time by the action of successive pins being ejected and closing switch 288 until all ten pins of set C are ejected into the now operating pin spotting machine rear elevator E. After the tenth pin of set C is ejected, clutch cam 332 closes its cooperating switch 333, and storage clutch 312 is thrown into drive shaft 250 in order to move the now empty cups 260 from which the pins of set C were ejected around until the first cup 260 is located beneath deflector 344 at which place movement of this cup stops through the action of cam 332 which opens switch 333.

While the storage conveyor chains 256 are moving empty cups 260 around, knockout cam 328 opens switch 329 and deenergizes solenoid 382 which returns ejecting arm 374 to a non-ejecting position and opens interlock switch 375 which removes the "pins-out" switch 288 from the circuit of clutch solenoid 349.

Also, during the travel of conveyor chains 256, deflector cam 330 has closed switch 331 but deflector solenoid 372 is not energized because contacts 432b are open at this time. Also during this travel of chains 256, "fake ball" cam 334 throws another "fake ball" by closing microswitch 335. The circuit arrangement is such that at this time no action occurs in the pin setting machine. Since the action takes place at a future time, it will be described hereinafter.

Since the elevator E starts running before pins begin to be ejected from the storage conveyor, therefore, from the time the first pin is ejected from storage cups 260 and during the above mentioned interim of empty storage cup travel, ejected pins are being elevated and conveyed into the awaiting empty holders 164 of the pin assembling conveyor 66 at station L. The operation is as follows: As a pin being delivered from the conveyor belts 107 is deposited into awaiting empty No. 1 holder 164 of the pin assembling conveyor 66, the head of this pin strikes trigger 216 and closes switch 217. This action energizes clutch solenoid 208 which throws in distributor clutch 200 and allows the pin assembling conveyor 66 to index its train of cups, so that the second empty cup is advanced to station L directly over trigger 216 of switch 217 awaiting delivery of the next pin from belt conveyors 107.

This operation continues until all ten holders 164 are loaded. When the No. 10 cup is filled and the loaded train of holders 164 moves forward, lug 218 on No. 1 holder 164 engages trigger 224 and closes switch 226. This energizes relay 412 which is held in by its contact 412a. Closing of contact 412b engages distributor clutch 200 which causes the loaded train of holders 164 to advance to pin station M.

At the same time that the lug 218 on No. 1 holder 164 closes switch 226, it also opens switch 219 which deenergizes relay 428, but the elevator E continues running due to the fact that cam 326 has relay 436 energized, as described hereinabove.

At the end of the loading run of assembling conveyor 66, lug 218 of No. 1 holder 164 engages trigger 228 and opens switch 230. This deenergizes relay 412, which deenergizes solenoid 208 throwing out clutch 200 thereby stopping the loaded holders 164 at the pin station M ready to have the pins held in cups 164 removed by grippers N.

At the same time that the lug 218 on No. 1 holder 164 opened switch 230, it also momentarily operated switch 225 which is mounted beneath switch 230. As No. 1 holder 164 moved to dwell position (shown in Figure 3), lug 218 closed "second ball" switch 414 mounted on cross frame 221. The function of switch 414 will be explained hereinafter.

At the time when the tenth holder 164 is filled and the loaded train of holders 164 starts forward a lug 450 on No. 10 holder 164 opens a switch 452 mounted adjacent station L (Figure 3). This deenergizes relay 432 and closes its contacts 432b which allows deflector solenoid 372 to be energized and tilt deflector 344 into storage delivery position. It is held there through the action of deflector cam 330 and switch 331 which is closed at this time. This will insure the delivery of pins which are about to be swept from the alley and conveyed by elevator E and belts 107 into the now awaiting empty cups 260 on chains 256 of the storage device 249.

As previously mentioned "fake ball" cam 334 closes microswitch 335 but no action takes place at that time due to the circuit arrangement. However, now that the loaded train of holders 164 of pin assembling conveyor 66 have reached the pin station M and are ready to have pins held therein removed by grippers N, the circuit is now so actuated that the result is the same as if a second ball of the first frame of a game were rolled. This is termed throwing a second "fake ball."

Therefore, the pin spotting machine now goes through a normal second ball cycle. Table 101 descends, but does not pick up any of the ten pins which are standing on the alley since respotters 103 are deenergized. Table 101 then rises, and sweep S operates, sweeping the standing ten pins into pit P from where they are conveyed by apron 10 onto the now operating rear elevator E. Table 101 now turns 180° and sets the ten pins which were held in spotters 99 on alley G and then rises.

During the operation of the pin spotting machine, a cam (not shown) on shaft 255 of the machine control in cam box 420 energizes relay 424 and holds it in. The pins in elevator E are elevated, conveyed by conveyor belts 107 and discharged therefrom into deflector 344 and into now awaiting empty storage cups 260, at which time each pin upon being deposited into a cup closes the "pins-in" storage switch 350 which energizes solenoid 349 which allows storage clutch 312 to engage, and advance the pin storage conveyor chains 256, one cup at a time, until all ten cups 260 are filled, at which time clutch cam 332 keeps the storage clutch engaged long enough to run the storage conveyor around so that the first pin of the original second set of storage pins (set D) arrives at the ejecting station 281.

While the storage conveyor is travelling "fake ball" cam 336 effects what is termed throwing a third "fake ball," first ball, second frame. The second ball switch 414, previously mentioned, is at this moment being held closed by the lug 218 on the No. 1 holder 164, thus insuring that the closing of switch 337 by cam 336 will shunt the pit switch 408 and put the machine through a normal first ball operation, unless the required number of pin assembling holders 164, ten as shown, each contains a pin and is located in proper position at station M.

Therefore, when the filled holders are positioned at station M, as described, pit switch 408 is now shunted and there is provided a repeat cycle thereby effecting a complete transfer of the two sets of pins C and D which were in storage device 249 for the two sets of pins A and B which were in the machine.

After delivery of the tenth pin of the second set of original pins in the pin spotting machine to storage device 249, the movement of storage conveyor chains 256 is interrupted, and motor and elevator cam 326 opens its double throw switch 327 which shuts off the motor 292 and pin setting machine elevator E.

Relay 480 is deenergized at the proper time at the completion of the changing of two complete sets of pins by deenergization of relay 436 by the opening of contact 436c, which opens the hold-in circuit of relay 480.

When it is desired to exchange only one set of pins, switch 400 is thrown clockwise to the 1S position which effects a closing of a contact 402, rendering relay 480 inactive. At this time cam 482 prevents the control operating effect of throwing a third "fake ball" by opening the circuit to contacts 337 prior to the time the third "fake ball" would normally be throw but after the second "fake ball" is thrown. Switches 484 operated by cam 482 also open the circuit of motor 292 through contacts 436b of relay 436 causing motor 292 to stop. This operation sets the machine for the next at-will operation of the machine.

The invention above described may be varied in construction within the scope of the claims, for the particular device selected to illustrate the invention is but one of many possible concrete embodiments of the same. It is not, therefore, to be restricted to the precise details of the structure shown and described.

What I claim is:

1. In a bowling pin spotting machine, a pin spotter, means for conveying sets of pins to said spotter, a pin storage, a pin diverter for conveying pins delivered thereto by said conveying means into said storage, an operating device for said diverter, means normally incapacitating said operating device of said diverter whereby said conveying means delivers pins to said spotter only, mechanism for removing pins from said storage, and selective control mechanism for selectively operating said diverter operating device and said removing mechanism to effect the removal of one or two sets of pins from said storage and the delivery of a like number of sets of pins to said storage, and means receiving pins removed from storage and delivering them to said conveying means.

2. In a bowling pin setting machine, a pin spotter, a pin receiving station, means for transferring pins from said station to said spotter, a conveyor for delivering pins to said station, a pin storage, mechanism normally operative to deliver pins to said conveyor, a pin deflector, movable means normally supporting said deflector in an inoperative position relative to the discharge end of said conveyor, and selectively operated means including means for moving said deflector into the path of movement of pins discharged from said conveyor for interrupting the flow of pins to said station and effecting the delivery thereof by said deflector into said storage, said last-named means including mechanism operative in response to the delivery of a predetermined number of pins to said storage for returning said deflector to said inoperative position, and thereby reestablishing the delivery of pins to said station.

3. In a pin spotting machine for use on a bowling alley having a bed and a pit at the rear end of said bed, in combination, pin receiving means for receiving in-play pins for re-use in said machine, a pin storage in said machine for receiving pins for transfer out of use in said machine, an endless conveyor in said storage, a plurality of pin supports on said endless conveyor for supporting a reserve set of pins for substitution in the machine in place of in-play pins transferred out of play, a pin elevating conveyor normally operable to remove pins from said pit of said alley and deliver the same to said pin receiving means, means selectively operable to transfer pins from said pin elevating conveyor into said pin storage, and means selectively operable for delivering reserve pins from said supports in said storage to said pin receiving means.

4. The machine defined in claim 3 wherein said pin receiving means comprises an endless conveyor, a plurality of spaced pin holders mounted on said conveyor and movable therewith, and pin actuated means operative in response to the arrival of a pin in one holder for moving the next empty holder into position to receive the next pin delivered by said pin elevating conveyor.

5. In a bowling pin spotting machine, a pin receiving station, mechanism for delivering a plurality of in-play pins one after another to said station, pin transport mechanism, including uniformly spaced individual pin receiving and supporting members adapted to receive and support in-play pins, means for intermittently moving said transport mechanism to locate said members at said station for receiving in-play pins delivered in succession to said members by said first-named mechanism for re-use in said machine, a pin storage device for reserve pins, spaced pin supporting members in said device, movable support means for said members, and selective mechanism for interrupting the movement of in-play pins in succession to said supporting members of said transport mechanism and diverting said in-play pins out of play in succession into said supporting members of said storage device.

6. In a bowling pin spotting machine, a pin delivery conveyor for conveying pins to a point of discharge, a pin assembly conveyor located adjacent said point of discharge, means for effecting the delivery of a predetermined number of in-play pins by said delivery conveyor to said assembly conveyor, a pin storage device constructed and arranged to hold a plurality of pins in reserve, a pin diverter, selectively operated means for moving said diverter into the path of travel of in-play pins discharged by said delivery conveyor at said point of discharge to direct said pins out of play and into said storage device, and selectively operated means for removing from said storage device an equal number of reserve pins in replacement for said pins delivered out of play thereinto.

7. A pin handling and changing device for use in a bowling pin spotting machine having a pin spotter and means for delivering pins to said spotter, a pin storage mechanism, operating means for said mechanism and means, a deflector for directing pins away from said pin delivering means into said storage mechanism, operating mechanism controlling the operation of said pin spotting machine operating means and said deflector, said operating mechanism including an actuating circuit, and a solenoid in said circuit connected to said deflector, and selective control mechanism for controlling the actuation of said circuit to effect the alternate operation of said solenoid for delivering selected pins in succession to said pin spotter and to said storage mechanism.

8. Pin changing mechanism for a bowling pin spotting machine having a pin spotter comprising a pin storage adapted to hold reserve pins, a conveyor for removing in-play pins from the pit of a bowling alley, a pin delivery station, a conveyor receiving in-play pins from said first-named conveyor for delivery to said delivery station, conveying means for conveying in-play pins from said station for use in said spotter, a normally inoperative conveyor located adjacent said delivery station for receiving and delivering into said storage in-play pins discharged at said station from said second-named conveyor, and selectively operated mechanism for actuating said last-named conveyor to locate it in position to receive and deliver in-play pins out-of-play and into said storage.

9. Pin changing mechanism as defined in claim 8, including automatic selectively operated mechanism operative in response to the operation of said selectively operated conveyor operating mechanism for delivering reserve pins out of said pin storage into said pit in substitution for in-play pins being discharged by said last-named conveyor.

10. Pin changing mechanism for a bowling pin spotting machine having a pin spotter, comprising a pin receiving station, a conveyor for removing bowling pins from the pit of a bowling alley, transfer means at said receiving station for conveying in-play pins for transfer to said spotter, a delivery conveyor positioned to receive in-play pins discharged from said first-named conveyor for delivery to said station, a pin storage for reserve pins, a deflector located at said delivery station adjacent the discharge end of said delivery conveyor and adjacent the path of movement of pins delivered from said first-named conveyor, means normally locating said deflector in in- operative position relative to said delivery conveyor whereby in-play pins are delivered by said delivery conveyor at said station to said receiving station, means for operating said delivery conveyor to effect the delivery of in-play pins seriatim to said receiving station, and selectively operated control mechanism for moving said deflector into operative position relative to the discharge end of said delivery conveyor at said delivery station to receive and deliver in-play pins out of play from said station into said storage.

11. Pin changing mechanism for a bowling pin spotting machine, comprising a pin delivery station, a conveyor system for removing bowling pins from the pit of a bowling alley, a delivery conveyor positioned to receive pins delivered from said first-named conveyor for delivery thereby to said station, a pin storage, a device for guiding said pins in succession into said storage, mechanism for removing pins from said storage, means normally locating said device in inoperative position out of the path of travel of pins discharged from said delivery conveyor to said station, means for driving said delivery conveyor to effect the delivery of said pins in succession to said station, selective control mechanism for moving said device into operative position in the path of travel of pins discharged from said delivery conveyor to receive and guide into said storage said pins delivered thereto one after another, and means also forming a part of said control mechanism for operating said storage pin removing mechanism to discharge pins from said storage for delivery to said pin delivery station.

12. In a bowling pin spotting machine, a pin spotter for spotting bowling pins on the pin supporting bed of a bowling alley adjacent the pit thereof, a sweep for removing pins from said alley and delivering same into said pit, a pin assembling device, means for delivering a predetermined number of pins from said device to said spotter, a movable pin storage conveyor for out-of-play pins having a plurality of pin supporting means, mechanism for conveying in-play pins from said pit for selective delivery to said device or said storage conveyor, and selectively operated mechanism for routing a predetermined number of selected pins carried by said conveying mechanism to said pin supporting means of said movable pin storage conveyor.

13. In a bowling pin spotting machine, a pin spotter for spotting a set of pins on the pin supporting bed of a bowling alley adjacent the pit thereof, a sweep for ejecting pins from said alley into said pit, a pin assembling conveyor, a pin storage conveyor, mechanism for conveying sets of pins from said pit to a point of discharge into said assembling conveyor, means for conveying a predetermined number of pins from said assembling conveyor to said spotter, and a pin directing device coacting with said conveying mechanism located adjacent said point of discharge and adapted to receive pins discharged from said mechanism and direct pins to said pin storage conveyor, means normally locating said device out of the path of travel of pins delivered by said conveying mechanism to said assembling conveyor for delivery to said spotter, and selectively operable means for locating said device in a different position to direct a plurality of pins in succession out of play into said storage conveyor.

14. In a bowling pin spotting machine, a pin spotter adapted to spot a first set of in-play pins on a bowling alley adjacent the pit thereof, mechanism for removing pins from said alley, operating means for actuating said mechanism to remove said first set of pins from said alley, means in said machine for holding a second set of in-play pins, a storage device in said machine constructed and arranged to hold two sets of reserve pins for selective delivery in sets to said spotter, operating means in said storage for discharging reserve pins from said storage device into play, means for delivering said first set of pins removed from said alley into said storage device, means operative in response to the delivery of said first set of pins to said storage device for actuating said operating means in said storage device to discharge one set of said two sets of reserve pins into play, means for actuating said spotter to set said second set of in-play pins on said alley, and mechanism for again operating said first-named mechanism to remove said second set of in-play pins from said alley including means for again operating said delivering means for delivering said second set of in-play pins into said storage device, and means operative in response to the delivery of said pins of said second set of pins into said storage device to actuate said operating means in said storage device to discharge said second set of reserve pins from said storage device into play.

15. In a bowling pin spotting machine, a pin spotter for spotting in-play pins on the playing bed of a bowling alley adjacent the pit thereof, mechanism for removing pins from said bed and depositing them in said pit, a storage device arranged to hold reserve pins, means for operating said mechanism, conveying mechanism for removing a plurality of in-play pins from said pit, selectively operated means for directing said in-play pins in succession into said storage device, and mechanism operative in response to the delivery of said last-named pins into said device for effecting the release of an equal number of reserve pins in succession from said storage device into the range of operation of said conveying mechanism for delivery thereby to said spotter in substitution for said in-play pins delivered to said storage device.

16. In a bowling pin spotting machine, a pin spotter adapted to place and replace in-play bowling pins on a bowling alley adjacent the pit thereof, a sweep for removing said in-play pins from said alley and depositing them in said pit, a storage device constructed and arranged to hold bowling pins in reserve, conveying mechanism for removing in-play pins from said pit and delivering them to a point of discharge, a conveyor positioned to receive said in-play pins discharged from said conveying mechanism for delivery to said spotter, a member located adjacent said point of discharge of pins from said conveying mechanism for diverting a plurality of in-play pins normally conveyed by said conveyor to said spotter one after another into said storage device, means for removing in succession from said storage device a number of reserve pins equal to that diverted into storage, and selective control mechanism for moving said diverting member into position to receive pins discharged from said conveying mechanism for operating said storage device removing means.

17. The machine defined in claim 16 wherein said storage device includes an endless conveyor provided with a plurality of pin supports, and including pin actuated means operative in response to the delivery of a pin into a support by said diverting means for advancing said endless conveyor to locate an empty support in position to receive the next pin transferred out of play.

18. In a bowling pin spotting machine, a pin spotter, a pin delivery station, conveying mechanism for conveying pins from said delivery station to said spotter, a conveyor for conveying a plurality of pins in succession to a point of discharge adjacent said delivery station for delivery to said conveying mechanism, a pin diverter located adjacent said point of discharge, means for moving said pin diverter into the path of travel of pins discharged by said last-named conveyor for delivery of a plurality of pins in succession out of play, and means for relocating said diverter in a position to permit the delivery of pins by said conveyor to said conveying mechanism when the desired number of in-play pins has been removed out of play.

19. In a bowling pin spotting machine, a pin spotter, a pin storage, a pin receiving station for said storage, a pin ejecting station for said storage spaced from said pin receiving station, supports in said storage constructed and arranged to support a plurality of sets of reserve pins, means at said pin ejecting station for releasing pins from said supports, conveying mechanism for delivering sets of in-play pins to said spotter, selectively operated mechanism for delivering in-play pins to said receiving station, said selectively operated mechanism including devices for actuating said means to cause reserve pins in said storage to be ejected at said ejecting station into the range of operation of said conveying mechanism for delivery thereby to said spotter, means for actuating said last-named devices until all in-play pins in said machine have been exchanged for and replaced by said reserve pins removed from said storage, and selectively actuated control means for operating said last-named means.

20. An article handling and exchanging device comprising an article storage mechanism, operating means for said storage mechanism, an article assembling mechanism spaced from said storage mechanism, operating means for said article assembling mechanism, article transport mechanism for conveying articles to said storage and to said assembling mechanism, said transport mechanism including an article diverter, means normally positioning said diverter to permit articles to pass said assembling mechanism, a solenoid connected to said diverter for moving said diverter into position relative to said transport mechanism to divert articles from said assembling mechanism to said storage mechanism, an operating circuit for said storage mechanism operating means, including a sub-circuit for said solenoid, an operating circuit for said assembling mechanism operating means, and means for selectively energizing said circuit and sub-circuit to locate said diverter in said position to direct selected articles from said transport mechanism to said storage mechanism.

21. A bowling pin handling and changing device comprising pin storage mechanism, pin assembling mechanism spaced from said storage mechanism, a pin transport device for conveying bowling pins to a selected mechanism, a pin diverter, means mounting said diverter for movement to a pin diverting position relative to said transport device, means normally positioning said diverter in a position permitting pins to pass to said pin assembling mechanism, a solenoid for moving said diverter into operative position, an operating circuit, said circuit including an operating circuit for said storage mechanism and a sub-circuit for said diverter, an actuating circuit for said assembling mechanism, a device for discharging pins from said storage mechanism, means for selectively energizing said circuit of said storage mechanism and said sub-circuit to locate said diverter in said pin diverting position to effect the delivery of selected pins by said diverter from said transport device and into said storage, and means for operating said device to discharge pins from said storage mechanism to said pin transport device.

22. In a bowling pin spotting machine, a pin spotter for spotting a set of pins on the pin supporting bed of a bowling alley adjacent the pit thereof, mechanism for ejecting pins from said alley into said pit, a pin receiving conveyor, an out-of-play pin storage for pins, mechanism normally operative to convey a plurality of pins seriatim to a point of delivery to said receiving conveyor, means for delivering said pins in said receiving conveyor to said spotter, a pin guide located adjacent said point of delivery, and selectively operated control mechanism for moving said pin guide into the path of movement of pins normally delivered to said receiving conveyor for routing said pins seriatim from said conveying mechanism to said out-of-play storage.

23. In a bowling pin spotting machine for use with an alley having a pin supporting bed, a spotter for placing a set of pins on said bed, a pin delivery station, an out-of-play pin storage device, mechanism in said device for supporting a plurality of sets of out-of-play pins in reserve in said storage device, conveying mechanism for delivering sets of pins to said station for delivery to said spotter or to said out-of-play pin storage device, selective automatically operated actuating means including a pin diverting member located at said station coacting with said conveying mechanism for delivering pins from said conveying mechanism to said out-of-play pin storage device, selective mechanism operating when sets of pins in play are to be exchanged for sets of pins in storage for operating said actuating means to move said diverter to receive and divert pins from said station into said storage, and means for operating said last-named mechanism.

24. In a bowling pin spotting machine having pin spotting mechanism, a pin delivering station, a pin transport mechanism, a plurality of pin supporting holders carried by said transport mechanism, means for intermittently driving said transport mechanism to position empty holders in succession at said station for delivery of pins thereinto, means for delivering pins from said holders to said pin spotting mechanism, an out-of-play pin storage device, a pin transport mechanism located in said out-of-play storage device, a plurality of pin supporting holders carried by said last-named transport mechanism, a pin receiving station in said storage device, means for intermittently driving said last-named transport mechanism to position empty holders in succession at said last-named station, a conveyor for delivering pins to said delivery station or said receiving station in said storage device, and selectively operated control mechanism for routing sets of pins from said conveyor to said pin delivery station for delivery to said first-named empty holders and to said pin storage receiving station for delivery to said pin storage holders in said storage device.

25. In a pin spotting machine having pin spotting mechanism, a pin transport mechanism including a plurality of in-play pin holders, a pin storage, a pin transport mechanism located in said storage including a plurality of out-of-play pin holders, said holders normally being operative to support and carry a plurality of reserve pins, a pin discharge station in said storage, a pin receiving station in said storage, selectively operated mechanism for removing reserve pins from said holders in said storage for delivery to said pin spotting mechanism, including means for intermittently driving said pin storage transport mechanism to locate pin-loaded holders in succession at said discharge station, said selectively operated mechanism also including means for locating empty pin storage holders at said pin storage receiving station, conveying mechanism normally operative to deliver pins to said first-named pin transport holders, and mechanism operative when reserve pins are to be removed from said storage and replaced by pins carried by said conveying mechanism for directing pins normally delivered to said first-named holders to said pin storage receiving station for delivery to said pin storage transport holders.

26. In a bowling pin spotting machine, a pin spotter, a pin delivery station, a device for conveying pins from said delivery station to said pin spotter, a pin storage station, a delivery conveyor for delivering bowling pins to said delivery station for delivery to said device and storage station, selectively actuated means located at said delivery station adjacent the point of discharge of pins from said delivery conveyor coacting with said delivery conveyor for delivering pins from said delivery conveyor to said storage station, driving mechanism for said delivery conveyor, and automatically operated control mechanism for selectively operating said means to effect the movement of selected pins from said pin receiving station to said storage station or to said device.

References Cited in the file of this patent

UNITED STATES PATENTS

| | | |
|---|---|---|
| 777,235 | Abraham | Dec. 13, 1904 |
| 1,292,738 | Estabrook | Jan. 28, 1919 |
| 1,350,777 | Brown | Aug. 24, 1920 |
| 1,449,012 | Lorenz et al. | Mar. 20, 1923 |
| 1,468,212 | Redfield | Sept. 18, 1923 |
| 1,623,247 | Johnson et al. | Apr. 5, 1927 |
| 1,692,796 | Bishop | Nov. 20, 1928 |
| 1,774,047 | Wharton | Aug. 26, 1930 |
| 1,919,169 | Plausics | July 18, 1933 |
| 1,998,757 | Hauk | Apr. 23, 1935 |
| 2,341,476 | Parra et al. | Feb. 8, 1944 |
| 2,388,707 | Rundell | Nov. 13, 1945 |
| 2,388,708 | Bates | Nov. 13, 1945 |
| 2,390,302 | Henricksen | Dec. 4, 1945 |
| 2,616,694 | Montooth | Nov. 4, 1952 |